United States Patent
Mores et al.

(10) Patent No.: US 9,731,831 B2
(45) Date of Patent: Aug. 15, 2017

(54) AIRCRAFT WITH AN AIR INTAKE FOR AN AIR BREATHING PROPULSION ENGINE

(71) Applicant: AIRBUS HELICOPTERS DEUTSCHLAND GMBH, Donauworth (DE)

(72) Inventors: Sebastian Mores, Munich (DE); Frank Loeser, Kaisheim (DE); Stefan Probst, Buchdorf (DE); Michael Matt, Ismaning (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 77 days.

(21) Appl. No.: 14/849,093

(22) Filed: Sep. 9, 2015

(65) Prior Publication Data
US 2016/0075439 A1 Mar. 17, 2016

(30) Foreign Application Priority Data
Sep. 12, 2014 (EP) .................................. 14400046

(51) Int. Cl.
*B64D 33/02* (2006.01)
*F02C 7/055* (2006.01)
(Continued)

(52) U.S. Cl.
CPC .............. *B64D 33/02* (2013.01); *F02C 7/052* (2013.01); *F02C 7/055* (2013.01); *B64C 27/04* (2013.01);
(Continued)

(58) Field of Classification Search
CPC .............. B64D 33/02; B64D 2033/022; B64D 2033/0246; B64D 2033/0253; F02C 7/052;
(Continued)

(56) References Cited

U.S. PATENT DOCUMENTS 2,374,412 A * 4/1945 Caldwell ................ B64D 33/02
123/41.56
2,407,194 A * 9/1946 Vokes ..................... F02C 7/052
55/302
(Continued)

FOREIGN PATENT DOCUMENTS

DE 29906712 9/1999
EP 2133265 8/2010
(Continued)

OTHER PUBLICATIONS

Japanese Office Action for Japanese Application No. JP 2015-116817, Dated Jun. 1, 2016, 3 Pages.
(Continued)

*Primary Examiner* — Joseph W Sanderson
(74) *Attorney, Agent, or Firm* — Brooks Kushman P.C.

(57) ABSTRACT

An aircraft with a fuselage that accommodates at least one air breathing propulsion engine, the fuselage having a maximum fuselage width determined in the region of the at least one air breathing propulsion engine and comprising at least one front fuselage cowling and at least one rear fuselage cowling that are each covering the at least one air breathing propulsion engine at least partly, the at least one front and rear fuselage cowlings being spaced apart from each other in a direction transverse to a longitudinal axis of the at least one air breathing propulsion engine by a predetermined cowling offset to define a dynamic air intake through which an intake air stream is supplied to the at least one air breathing propulsion engine in operation.

18 Claims, 16 Drawing Sheets

(51) Int. Cl.
*F02C 7/052* (2006.01)
*B64C 27/04* (2006.01)

(52) U.S. Cl.
CPC .............. *B64D 2033/022* (2013.01); *B64D 2033/0253* (2013.01); *F05D 2220/329* (2013.01); *F05D 2260/607* (2013.01); *Y02T 50/675* (2013.01)

(58) Field of Classification Search
CPC .. F02C 7/055; F05D 2260/607; F02M 35/048
See application file for complete search history.

(56) References Cited

U.S. PATENT DOCUMENTS

| | | | | |
|---|---|---|---|---|
| 2,425,508 A * | 8/1947 | Chilton | ............. | B64D 33/02 123/198 E |
| 2,546,153 A * | 3/1951 | De Remer | ............. | B64D 33/02 123/41.7 |
| 2,699,906 A | 1/1955 | Lee | | |
| 2,944,631 A * | 7/1960 | Kerry | ............. | B64D 33/02 55/306 |
| 2,969,941 A | 1/1961 | Hobart, Jr. | | |
| 3,333,794 A * | 8/1967 | Lewis | ............. | B64D 33/02 244/53 B |
| 3,421,296 A * | 1/1969 | Beurer, Sr. | ............. | B64D 33/02 209/710 |
| 3,449,891 A * | 6/1969 | Amelio | ............. | B64D 33/02 244/53 B |
| 3,509,568 A * | 4/1970 | Manning | ............. | B64D 33/02 219/209 |
| 3,583,661 A | 6/1971 | Stake | | |
| 4,397,431 A * | 8/1983 | Ben-Porat | ............. | B64D 33/02 244/53 B |
| 4,456,458 A * | 6/1984 | Gilbertson | ............. | B01D 45/04 244/53 B |
| 4,502,875 A * | 3/1985 | Ballard | ............. | F02C 7/052 137/15.1 |
| 5,697,394 A | 12/1997 | Smith et al. | | |
| 5,906,334 A * | 5/1999 | Chamay | ............. | B64D 33/02 244/53 B |
| 6,138,950 A * | 10/2000 | Wainfan | ............. | B64D 33/02 244/53 B |
| 6,595,742 B2 | 7/2003 | Scimone | | |
| 6,634,595 B2 * | 10/2003 | Koncsek | ............. | B64D 33/02 137/15.1 |
| 7,491,253 B2 * | 2/2009 | Wilson | ............. | B01D 46/002 123/198 E |
| 7,575,014 B2 * | 8/2009 | Stelzer | ............. | B64D 33/02 137/15.1 |
| 7,634,984 B2 * | 12/2009 | Stelzer | ............. | B01D 46/0005 123/198 E |
| 7,854,778 B2 * | 12/2010 | Groom | ............. | B64D 33/02 55/306 |
| 8,163,050 B2 | 4/2012 | Belyew | | |
| 8,361,209 B2 * | 1/2013 | Colaprisco | ............. | B01D 46/12 55/422 |
| 8,439,295 B2 * | 5/2013 | Belyew | ............. | B01D 46/10 244/53 B |
| 8,512,450 B2 * | 8/2013 | Kazlauskas | ............. | B64D 33/02 244/53 B |
| 9,067,679 B2 * | 6/2015 | Scimone | ............. | B64D 15/12 |
| 2002/0182062 A1 | 12/2002 | Scimone | | |
| 2006/0223429 A1 * | 10/2006 | Groom | ............. | B64D 33/02 454/155 |
| 2009/0261208 A1 | 10/2009 | Belyew | | |
| 2010/0269511 A1 | 10/2010 | Vauchel | | |
| 2014/0077039 A1 * | 3/2014 | Scimone | ............. | B64D 15/12 244/23 B |
| 2015/0314883 A1 * | 11/2015 | Judas | ............. | B64D 33/02 244/53 B |
| 2016/0017804 A1 * | 1/2016 | Afrianto | ............. | F02C 6/08 60/39.092 |

FOREIGN PATENT DOCUMENTS

| | | | | |
|---|---|---|---|---|
| FR | 3023587 A1 * | 1/2016 | ............. | F01D 25/12 |
| GB | 2509886 A * | 7/2014 | ............. | F02C 7/052 |
| JP | H04218496 | 8/1992 | | |
| JP | H04218496 A | 8/1992 | | |
| RU | 89068 U1 | 11/2009 | | |
| RU | 146302 U1 | 10/2014 | | |
| WO | 2010077241 | 7/2010 | | |
| WO | 2012160375 | 11/2012 | | |

OTHER PUBLICATIONS

Canadian Search Report for Canadian Application No. 2,894,083 Completed by the Canadian Patent Office on May 2, 2016, 4 Pages.
European Search Report for European Application No. EP 14400046, Completed by the European Patent Office on Feb. 16, 2015, 6 Pages.
Federal Service on Industrial Property Search Report, Completed on Aug. 30, 2016, for Russian Application No. RU201513191, Filed on Aug. 19, 2015, 2 Pages.

* cited by examiner

AIRCRAFT WITH AN AIR INTAKE FOR AN AIR BREATHING PROPULSION ENGINE

CROSS REFERENCE TO RELATED APPLICATION

This application claims priority to European patent application No. 14 400046.0 filed on Sep. 12, 2014, the disclosure of which is incorporated in its entirety by reference herein.

BACKGROUND OF THE INVENTION (1) Field of the Invention

The invention is related to an aircraft with a fuselage that accommodates at least one air breathing propulsion engine, said fuselage being provided with an air intake through which an intake air stream is supplied to said at least one air breathing propulsion engine in operation, said aircraft comprising the features of claim 1.

(2) Description of Related Art

In aircraft with air breathing propulsion engines, such as gas turbine engines, gas propelled engines or diesel engines, a sufficient air supply to the air breathing propulsion engines must be ensured such that these engines are able to combust a provided air/fuel mixture properly in order to deliver a required amount of power to an underlying drive system. If, however, an intake air stream, which enters the air breathing propulsion engine, does not meet certain engine recommendations, e.g. pressure loss, temperature, swirl, distortion, etc., the engine may not perform sufficiently or as expected, especially regarding fuel consumption and exhaust emissions, which may be affected negatively. Accordingly, these engine recommendations must be considered when implementing an air intake for such an air breathing propulsion engine in an aircraft.

In cases, where the aircraft is implemented as a rotary-wing aircraft, e.g. as a helicopter, the integration of an air breathing propulsion engine into a fuselage of the helicopter inherently results in a performance degradation with respect to underlying performance specifications provided by the engine manufacturer, i.e. to corresponding performance losses. These performance losses due to the installation of the engine into the helicopter's fuselage, which are also referred to as "engine installation losses", are generally divided into intake losses, exhaust losses and bleed air extraction losses, wherein intake losses are caused by total pressure drop, static temperature rise, swirl angle, pressure distortion, and so on.

However, as a helicopter fuselage generally exhibits limited space and volume, only a constrained air intake area can be realized. Additionally, the intake air stream for the air breathing propulsion engine must be directed from an ambient outside region of the helicopter fuselage into the engine plenum. Furthermore, the intake air stream must be cleaned, as it may be contaminated with foreign objects, such as dust, gravel, etc., which should ideally not be sucked into the engine, as they could damage the engine and thereby create additional efforts in order of costs, maintenance, and reliability.

Moreover, since the helicopter is adapted for multiple flight modes, i.e. hover, forward flight, backward flight, sideward flight, quartering, etc., the air breathing propulsion engine is provided with incoming air from various directions with differing pressures and temperatures. Therefore, usually two different types of air intakes are currently implemented on helicopters, which are respectively mainly designed for only one specific flight condition: so-called static intakes and dynamic intakes. These intakes are suitable to guarantee comparatively good engine output performances in the specific flight condition for which they are designed, while a lack in performance may occur for the other, or complementary, specific flight condition.

More specifically, a dynamic intake is an air intake that provides low pressure losses during forward flight conditions. Therefore, a dynamic intake usually implies some sort of scoop in order to provide sufficient high-pressure air to the engine plenum, so that dynamic pressure is introduced into the engine plenum.

The document EP 2 133 265 B1 describes such a dynamic intake of a helicopter. This dynamic intake is implemented as a dual air intake and comprises an outer air intake which ducts the intake air stream to a main engine of the helicopter, and an inner air intake ducting the intake air stream to auxiliary units, e.g. an oil cooler.

In contrast thereto, a static intake is an air intake with low installation losses during slow or hover flight conditions due to an unspoilt installation, which mainly does not provide high dynamic pressures, so that no or only a minimum of dynamic pressure is introduced into the engine plenum. Such static intakes are mainly used for helicopters and are usually provided with inlet barrier filters, knowing that these static intakes do no perform ideally in typical cruise flight conditions due to increased installation losses.

By way of example, the documents U.S. Pat. Nos. 8,163, 050 B2, 6,595,742 B2, US 2009/0261208 A1 and U.S. Pat. No. 5,697,394 respectively describe such a static intake that is provided with an inlet barrier filter for removing contaminant from the intake air stream. According to U.S. Pat. No. 6,595,742 B2 and US 2009/0261208 A1, the inlet barrier filter is moveable between different associated operating positions and according to U.S. Pat. No. 5,697,394 a part of a fuselage cowling that is located upstream of the inlet barrier filter is moveable between such different associated operating positions.

BRIEF SUMMARY OF THE INVENTION

However, as static intakes are generally located near or at the engine plenum in order to guarantee a correct functioning, a respective distance between a given static intake and a corresponding engine exhaust is usually comparatively small. Because of this small distance, hot gases exiting from the engine exhaust may enter the static intake of the air breathing propulsion engine during hover, rearward flight or rear gusts. As these hot gases may have temperatures between 500° C. and 700° C., this may not only lead to massive performance drops of the engine, but also lead to major problems in operational flight and certification of the entire helicopter. Therefore, in order to remedy this problem, the engine exhaust is frequently lengthened in order to increase its distance from the static intake.

Another problem that occurs with static intakes compared to dynamic intakes is that a static intake ingests all available surrounding air in all kind of flight conditions. While this is advantageous e.g. in hover, it is disadvantageous e.g. in fast forward flight conditions. Furthermore, in slow to medium forward flight conditions and, thus, slow to medium air flow conditions, the downwash of a helicopter's main rotor interacts with the static intake, leading to a variation of mass-flow entering the static intake, as an upper part of the static intake that is oriented towards the main rotor may ingest more mass-flow than its lower part. In general, this leads to increased engine installation losses due to additional swirl in the engine plenum.

Furthermore, as described above the static intakes are more and more equipped with inlet barrier filters, but also with other air-permeable engine protections, e.g. foreign object damage gutters, particle separators, ice protection grids and so on, in order to protect the air breathing propulsion engines against potentially damaging influences. However, because of these conventional air-permeable engine protections dynamic pressure is not increased sufficiently in the corresponding static intakes, which therefore generally lack in their performance during fast forward flight conditions.

It is, therefore, an object of the present invention to provide a new aircraft with one or more air intakes having reduced engine installation losses, which are provided with a suitable engine protection against potentially damaging influences, and which are suitable to allow control of the mass-flow entering the air intakes, to allow reduction of an underlying risk of hot gas re-ingestion and that provide a simple and efficient bypass system for incoming air.

This object is solved by an aircraft with a fuselage that accommodates at least one air breathing propulsion engine, said fuselage being provided with an air intake through which an intake air stream is supplied to said at least one air breathing propulsion engine in operation, said aircraft comprising the features of claim 1.

More specifically, according to the invention an aircraft comprises a fuselage that accommodates at least one air breathing propulsion engine. The fuselage has a maximum fuselage width determined in the region of the at least one air breathing propulsion engine and comprises at least one front fuselage cowling and at least one rear fuselage cowling that are each covering the at least one air breathing propulsion engine at least partly. The at least one front and rear fuselage cowlings are spaced apart from each other in a direction transverse to a longitudinal axis of the at least one air breathing propulsion engine by a predetermined cowling offset to define a dynamic air intake through which an intake air stream is supplied to the at least one air breathing propulsion engine in operation. The dynamic air intake defines an at least partly funnel-shaped air duct towards an engine integrated air inlet and is provided with at least one air-permeable engine protection that is adapted to clean the intake air stream upstream of the engine integrated air inlet in an associated protection mode. The at least one air-permeable engine protection is arranged transverse to the at least one front fuselage cowling with a predetermined protection inclination angle.

According to one aspect, the inventive aircraft comprises at least one air intake with reduced engine installation losses that combines the functionalities and advantages of a static and a dynamic air intake. More specifically, the at least one air intake is designed on the basis of a static intake that is defined by staggered front and rear cowlings in order to increase the dynamic pressure thereof, and with an inclined engine protection that is attached to the staggered cowlings. As a result, the at least one air intake is basically implemented as a static intake, but behaves aerodynamically like a dynamic intake and, consequently, defines a dynamic air intake. Accordingly, the at least one air intake is hereinafter referred to as a "dynamic air intake".

Advantageously, the inclined air-permeable engine protection protects the dynamic air intake at least against foreign objects, such as dust, birds, gravel, leaves, stones, plastic bags and so on. However, it should be noted that in the context of the present invention the term "foreign objects" is not limited to the above cited objects and comprises according to its broadest meaning, and with the exception of air, any object that is foreign to and that may damage the air breathing propulsion engine or decrease its performances, such as snow, ice, droplets, humidity and so on.

Preferably, the air-permeable engine protection comprises a screen-like air cleaning element. By way of example, this screen-like air cleaning element is embodied as an inlet barrier filter with a filter mat. However, the present invention is not restricted to such inlet barrier filters and may likewise be realized with foreign object damage gutters, particle separators, ice protection grids and so on. Furthermore, a combination of two or more of such screen-like air cleaning elements is also contemplated. For instance, a foreign object damage gutter can be combined with an inlet barrier filter, and so on.

According to one aspect, the dynamic air intake is aerodynamically optimized for slow and hover flight conditions by implementing the air-permeable engine protection with a large engine protection surface, which is then inclined towards the airflow. This is done by an offset which is created between the front fuselage cowling, e.g. a front main gear box cowling, and the rear fuselage cowling, e.g. an aft engine cowling.

The inclination of the engine protection surface itself advantageously increases an underlying dynamic effect of the dynamic air intake due to a height variation between a leading edge and a trailing edge of the air-permeable engine protection. Furthermore, a given pressure drop is reduced since the intake air stream is entering the air-permeable engine protection at a more favourable angle. Ideally, the intake air stream hits the engine protection surface at an angle of 90°, in particular in forward flight conditions.

However, the greater the inclination angle is, the less pressure drop occurs, in particular due to the filter effect in cases where the air-permeable engine protection is realized as a filter element, which is a well-known aspect in filter industry. This aspect is already exploited in static intakes that are particularly advantageous in hover flight conditions, where the intake air stream is ingested into the filter element orthogonally through the filter element.

Moreover, at a given longitudinal length, which can be selected for the engine protection surface, any inclination angle $\alpha$ will increase an effective engine protection surface by $\tan \alpha$. This allows providing more effective protective surface and leads to a reduced maintenance effort due to an increased time duration before clogging of the air-permeable engine protection may occur. This further protects the air breathing propulsion engine from re-ingesting hot exhaust gases and allows adjusting the amount of mass-flow entering the dynamic air intake.

Advantageously, the engine integrated air inlet is covered by the dynamic air intake. Thus, improved acoustic and noise emission characteristics can be achieved. Furthermore, the inventive dynamic air intake does not require provision of an additional external scoop, so that a minimized aerodynamic interaction flow phenomenon, such as tail shake, and a reduced parasite drag can be achieved.

According to a preferred embodiment, said predetermined cowling offset is selected from a range between +0.025 times and +0.5 times of said maximum fuselage width, said predetermined cowling offset comprising preferably +0.2 times of said maximum fuselage width.

According to a further preferred embodiment, said predetermined protection inclination angle is selected from a range between +1° and +100°, said predetermined protection inclination angle comprising preferably +15°.

According to one aspect, said at least one air-permeable engine protection defines an essentially flat or planar air cleaning surface. Alternatively, said at least one air-permeable engine protection defines a curved, kinked and/or discontinuous air cleaning surface. In other variants, the at least one air-permeable engine protection has an air cleaning surface that combines two or more different shapes, i.e. that is partly planar and partly curved, or partly kinked and partly discontinuous, and so on.

According to a further preferred embodiment, said dynamic air intake comprises an outer intake cover that extends from the at least one rear fuselage cowling in a direction opposed to said engine integrated air inlet, said outer intake cover defining an outer scoop of said at least partly funnel-shaped air duct.

According to a further preferred embodiment, said outer intake cover protrudes from said at least one rear fuselage cowling in a direction transverse to said longitudinal axis of said at least one air breathing propulsion engine by a predetermined transverse cover offset. Said predetermined transverse cover offset is preferentially selected from a range between −0.19 times and +1.01 times of said maximum fuselage width, said predetermined transverse cover offset comprising preferably +0.01 times of said maximum fuselage width.

According to a further preferred embodiment, said outer intake cover defines a cover front edge and said at least one air-permeable engine protection defines a protection leading edge and a protection trailing edge, said protection leading edge being arranged, in said associated protection mode, upstream of said cover front edge at said at least one front fuselage cowling and said protection trailing edge being arranged, in said associated protection mode, downstream of said cover front edge at said at least one rear fuselage cowling.

According to a further preferred embodiment, said cover front edge of said outer intake cover is spaced apart from said protection trailing edge of said at least one air-permeable engine protection in a direction parallel to said longitudinal axis of said at least one air breathing propulsion engine by a predetermined longitudinal cover offset. Said predetermined longitudinal cover offset is preferentially selected from a range between 0 times and +1.23 times of said maximum fuselage width, said predetermined longitudinal cover offset comprising preferably +0.23 times of said maximum fuselage width.

According to a further preferred embodiment, said at least partly funnel-shaped air duct comprises at least one inner intake scoop with a linear, curved, kinked and/or discontinuous shape.

Advantageously, inner intake scoops protect the dynamic air intake from hot gas re-ingestion by increasing the distance to the air exhaust. They are additionally suitable to further increase the dynamic pressure of the dynamic air intake, so that the basically static intake is morphed even more into a dynamic air intake as it already is by its underlying configuration, as described above.

Moreover, such inner intake scoops, which may be realized as a single piece at the end, can be designed to adjust an amount of air entering the dynamic air intake as well as to adjust the mass-flow in a specific region of the engine integrated air inlet. Furthermore, by defining these inner intake scoops at predefined regions of the dynamic air intake, any interference or negative influence of the scoops on the performance during hover and slow flight conditions can be avoided.

Preferably, the inner intake scoops comprise a specific internal shape that is designed in order to reduce an upcoming air velocity and to increase a static pressure entering the engine integrated air inlet. This specific internal shape basically represents a diffusor, which is integrated in the cross-section of the inner intake scoops.

According to a further preferred embodiment, said at least one inner intake scoop comprises at least one of an inner top scoop that is inclined with respect to a protection top edge of said at least one air-permeable engine protection with a predetermined top inclination angle, an inner bottom scoop that is inclined with respect to a protection bottom edge of said at least one air-permeable engine protection with a predetermined bottom inclination angle, and an inner aft scoop that is inclined with respect to a protection bottom edge of said at least one air-permeable engine protection with a predetermined aft inclination angle. Said predetermined top inclination angle is preferentially selected from a range between 0° and +180°, and preferably comprises +10°. Said predetermined bottom inclination angle is preferentially selected from a range between 0° and +180°, and preferably comprises +10°. Said predetermined aft inclination angle is preferentially selected from a range between +5° and +150°, and preferably comprises +80°.

According to a further preferred embodiment, said at least one air-permeable engine protection comprises a top edge and a bottom edge. Said top edge is preferentially inclined relative to a horizontal plane of said aircraft by a predetermined top edge inclination angel that is selected from a range between +15° and +155°, said predetermined top edge inclination angle comprising preferably +45°. Said bottom edge is preferentially inclined relative to said horizontal plane of said aircraft by a predetermined bottom edge inclination angel that is selected from a range between −140° and +55°, said predetermined bottom edge inclination angle comprising preferably +10°.

According to a further preferred embodiment, an inner duct surface of said at least partly funnel-shaped air duct is inclined with respect to said at least one front fuselage cowling with a predetermined inner duct inclination angle, said predetermined inner duct inclination angle being selected from a range between 0° and +35°, and preferably comprising +5°.

According to a further preferred embodiment, an outer duct surface of said at least partly funnel-shaped air duct is inclined with respect to said at least one rear fuselage cowling with a predetermined outer duct inclination angle, said predetermined outer duct inclination angle being selected from a range between −5° and +35°, and preferably comprising +5°.

According to a further preferred embodiment, at least one protection actuator is provided for moving said at least one air-permeable engine protection between a closed position associated with said associated protection mode and an opened position associated with a bypass mode in which said intake air stream streams at least partly uncleansed into said engine integrated air inlet.

Preferably, said protection actuator is adapted for pivoting said at least one air-permeable engine protection around at least one rotation axis that is arranged adjacent to a protection trailing edge. Alternatively, said at least one air-permeable engine protection can be displaced by a linear motion or a combined linear/rotational motion.

Due to a potential clogging of the air-permeable engine protection in operation, e.g. by a plastic bag, sand, grass, etc., the intake air stream flowing into the dynamic air intake needs an ability to bypass the clogged air-permeable engine protection via a suitable bypass channel. Such a bypass channel is preferably created by moving the air-permeable engine protection into its opened position, i.e. into a position in which the air-permeable engine protection is inactive and wherein additional dynamic pressure can be created, so that the basically static intake is morphed even more into a dynamic air intake as it already is by its underlying configuration, as described above. The bypass channel provides for increased bypass surfaces compared to conventional bypass channels and, thus, a given engine performance can be increased in all flight conditions, also in clean air circumstances.

Advantageously, the means for creating the bypass channel are part of the dynamic air intake, so that both are integrated into a single system. Furthermore, a self-cleaning functionality of the air-permeable engine protection can be realized in its opened position, i.e. in a bypass mode, wherein installation losses of the air breathing propulsion engine are advantageously reduced.

According to one aspect, by adjusting the position of the air-permeable engine protection between its closed and opened positions, the inventive dynamic air intake can be adapted to various different operation conditions. More specifically, in the closed position, the air-permeable engine protection is active in a protection mode and the dynamic air intake is particularly suitable for low aircraft velocities and hover conditions. In the opened position, the air-permeable engine protection is inactive and the dynamic air intake is particularly suitable for high aircraft velocities and flight conditions that require an increased engine power output, e.g. single engine operation mode, emergency mode, just for a necessity of high power demand if wished or even only for a necessity of a reduced fuel consumption and/or an increased range during clean ambient air conditions. In particular, if the air-permeable engine protection is in its opened position for creating a bypass channel, e.g. because the air-permeable engine protection is clogged by foreign objects, the air-permeable engine protection is inactive and in the bypass mode and the intake air stream can flow into the air breathing propulsion engine in an unobstructed manner.

According to a further preferred embodiment, said dynamic air intake comprises a secondary intake provided on said at least one front fuselage cowling, said secondary intake being at least adapted to ingest water and/or a boundary layer streaming on said at least one front fuselage cowling towards said dynamic air intake and/or to ingest uncleansed air.

Such a secondary intake improves an overall air-intake installation performance of the inventive dynamic air intake, since an aerodynamic boundary layer, which commonly and physically exists, is separated and not ingested into the engine plenum. This secondary intake also improves the overall performances of the air breathing propulsion engine, as is does not only separate the boundary layer from the intake air stream, but also collects water that is present on the front fuselage cowling in rainy conditions. While water ingestion into the engine plenum is not a big problem, as air breathing propulsion engines are usually designed to be capable of ingesting water, avoidance or at least reduction of such water ingestion nevertheless leads to an improved air-intake installation.

Furthermore, an air stream that is generated via the secondary intake can either be sent overboard or introduced into a front engine bay volume. Hence, this air stream can be used for cooling purposes of mechanical and electrical parts or for further auxiliaries, such as electrical engines.

According to a further preferred embodiment, said secondary intake is provided between said at least one front fuselage cowling and a boundary layer separator, said boundary layer separator being spaced apart from said at least one front fuselage cowling by a predetermined separator offset that is selected from a range between +0.004 times and +0.015 times of said maximum fuselage width, said predetermined separator offset comprising preferably +0.005 times of said maximum fuselage width.

Preferably, said at least partly funnel-shaped air duct comprises in the region of said at least one rear fuselage cowling an opening, said opening being arranged upstream of said at least one rear fuselage cowling and being adapted to allow passing through of foreign, air-stream removed objects. Thus, clogging of the air-permeable engine protection can at least essentially be avoided, thus, prolonging a necessary maintenance and cleaning interval.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
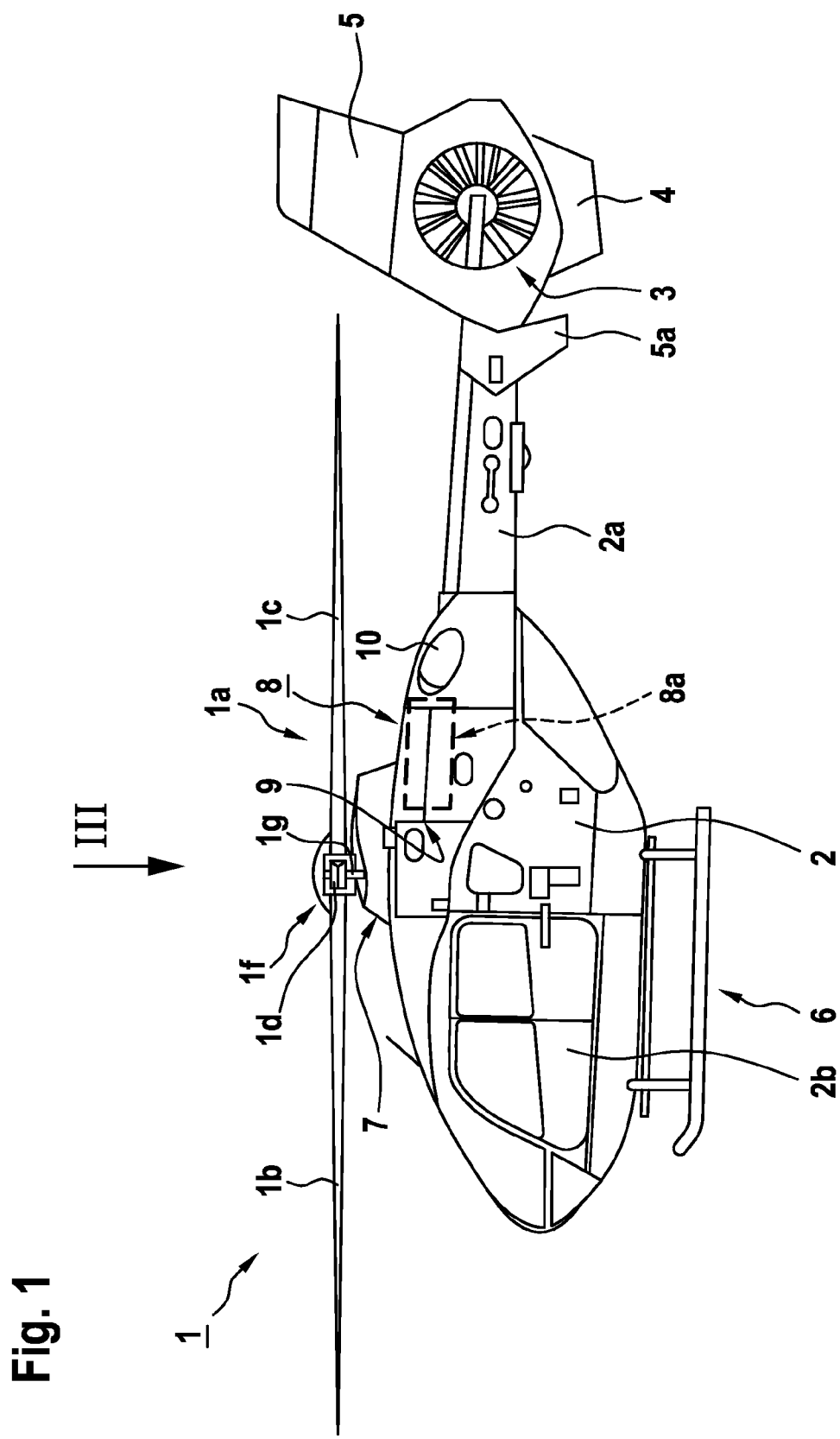
FIG. 1 shows a lateral view of a helicopter with at least one air breathing propulsion engine and an associated dynamic air intake according to the invention.

FIG. 1 shows an aircraft 1 with a fuselage 2. According to one aspect, the aircraft 1 is equipped with a power generation system 8. Preferably, this power generation system 8 comprises at least one air breathing propulsion engine 8a with an associated gas exhaust 10. The at least one air breathing propulsion engine 8a is preferably supplied with an intake air stream (14 in FIG. 13) by means of at least one associated dynamic air intake 9. This at least one dynamic air intake 9 is illustratively provided in a region of a main gear box 7 of the helicopter 1, and in particular slightly downstream of said main gear box 7, but may alternatively also be positioned in an application-specific manner at other locations on the fuselage 2.

By way of example, the aircraft 1 is illustrated as a rotary-wing aircraft and, more particularly, as a helicopter. Thus, for purposes of simplicity and clarity, the aircraft 1 is hereinafter also referred to as the "helicopter 1". It should, however, be noted that the present invention is not limited to helicopters and can likewise be applied to other rotary-wing aircraft, and aircraft in general, which are equipped with one or more air breathing propulsion engines, independent of a particular configuration thereof.

Illustratively, the fuselage 2 of the helicopter 1 is connected to a landing gear 6 and defines a tail boom 2a and a cabin 2b. The helicopter 1 further comprises at least one multi-blade rotor 1a for providing lift and forward or backward thrust during operation. The at least one multi-blade rotor 1a comprises a plurality of rotor blades 1b, 1c (and 1d, 1e in FIG. 2) that are mounted at an associated rotor head 1f to a rotor shaft 1g, which rotates in operation of the helicopter 1 around an associated rotor axis.

By way of example, the helicopter 1 further comprises at least one preferentially shrouded counter-torque device 3 configured to provide counter-torque during operation, i.e. to counter the torque created by rotation of the at least one multi-blade rotor 1a for purposes of balancing the helicopter 1 in terms of yaw. The at least one counter-torque device 3 is illustratively provided at an aft section of the tail boom 2a, which preferably further comprises a bumper 4, a tail wing 5a and a fin 5. The tail wing 5a is preferably adjustable in its inclination and can, thus, overtake the functioning of a horizontal stabilizer. Alternatively, or in addition, the helicopter 1 is provided with a suitable horizontal stabilizer.

Figure 2:
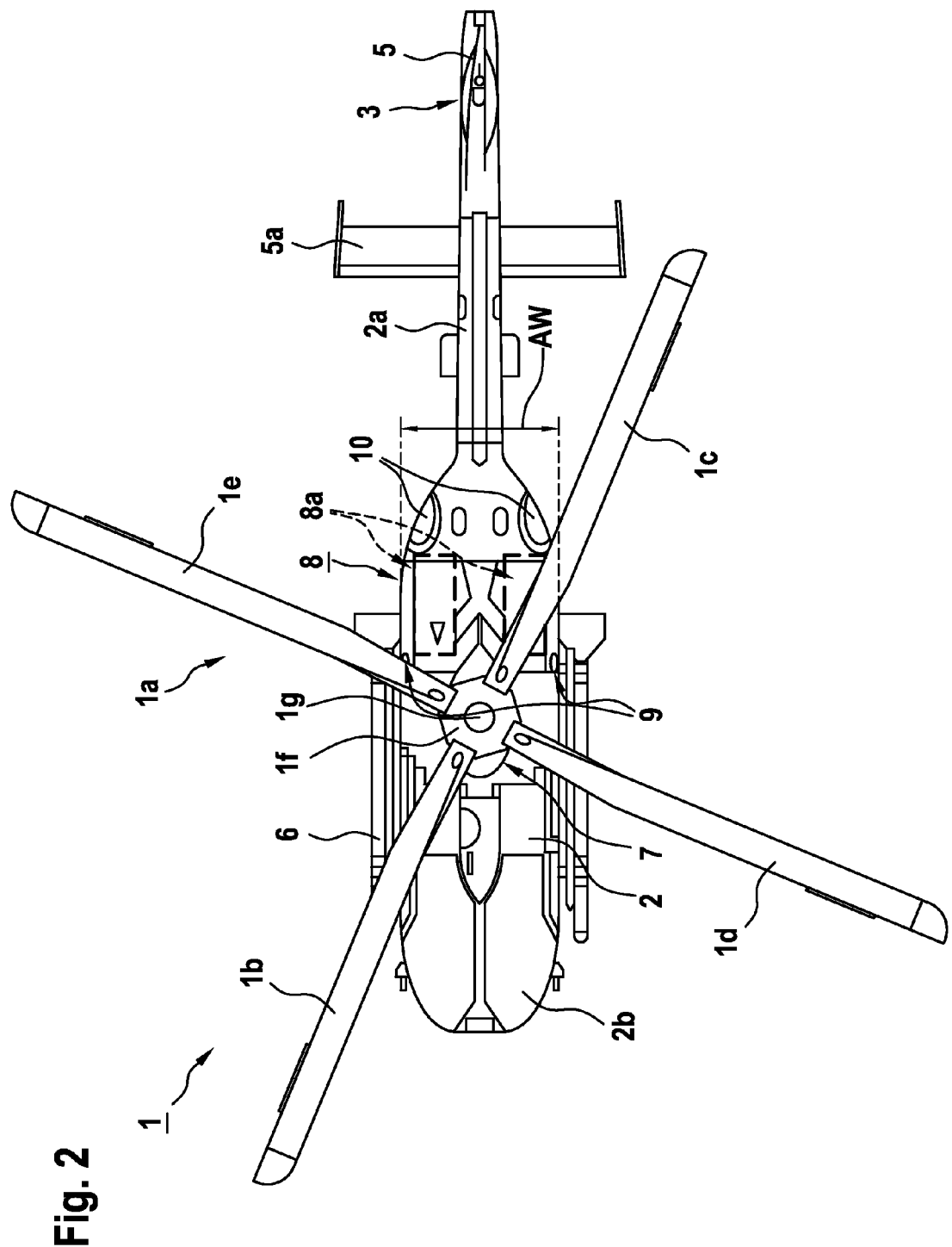
FIG. 2 shows a top view of the helicopter of FIG. 1.

FIG. 2 shows the helicopter 1 of FIG. 1 with the inventive power generation system 8 and two additional rotor blades 1d, 1e of the at least one multi-blade rotor 1a. According to one aspect, the power generation system 8 comprises two air breathing propulsion engines 8a that are each provided with an associated dynamic air intake 9 and that are preferably similarly constructed, at least within predetermined manufacturing tolerances. In the region of these two air breathing propulsion engines 8a, a maximum fuselage width AW of the helicopter 1 can be measured or determined.

It should be noted that the two air breathing propulsion engines 8a are illustratively located rather laterally on the helicopter 1. However, they may alternatively be located on other positions, such as e.g. in a more centered top region of the helicopter 1, and so on.

Figure 3:
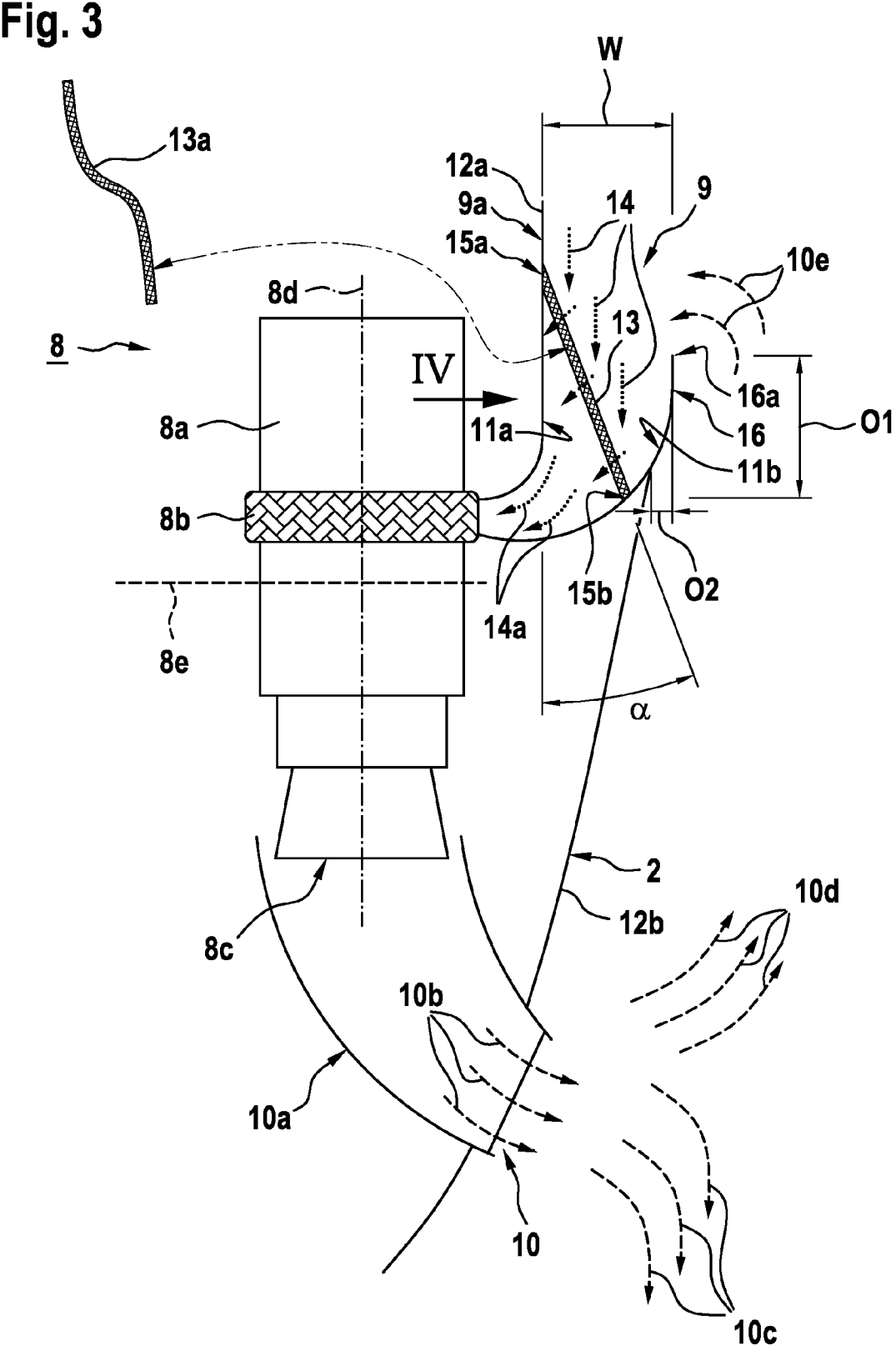
FIG. 3 shows a simplified sectional top view of the air breathing propulsion engine and the associated dynamic air intake of FIG. 1 and FIG. 2, seen in direction of an arrow III of FIG. 1.

FIG. 3 shows a single air breathing propulsion engine 8a of the power generation system 8 of FIG. 1 and FIG. 2, which is accommodated in the fuselage 2 of the helicopter 1 of FIG. 1 and FIG. 2 having the maximum fuselage width AW. The single air breathing propulsion engine 8a is associated with a single dynamic air intake 9 and a single gas exhaust 10 according to FIG. 1 and FIG. 2. In the following, an exemplary configuration of this single air breathing propulsion engine 8a with the single dynamic air intake 9 and the single gas exhaust 10 is described representative for each one of the two air breathing propulsion engines 8a of FIG. 1 and FIG. 2.

The air breathing propulsion engine 8a can be configured as any propulsion engine that comprises an engine integrated air inlet 8b, which is hereinafter for brevity also referred to as "engine plenum 8b", through which intake air is supplied to a combustion chamber for combusting a provided air/fuel mixture. In other words, the air breathing propulsion engine 8a can be implemented e.g. by any known gas turbine engine, gas propelled engine, diesel engine etc. Illustratively, the air breathing propulsion engine 8a comprises an engine integrated gas exhaust 8c and defines a longitudinal axis 8d and a transversal axis 8e.

It should be noted that the transversal axis 8e is perpendicular to the longitudinal axis 8d and coaxial with a corresponding transversal axis of the other air breathing propulsion engine 8a of FIG. 2. Therefore, the transversal axis 8e is also referred to as the "horizontal axis 8e" in the context of the present invention.

According to one aspect, the air breathing propulsion engine 8a is at least partly covered by at least one front fuselage cowling 12a and at least one rear fuselage cowling 12b of the fuselage 2. Illustratively, a single front fuselage cowling 12a covers a front portion of the air breathing propulsion engine 8a, approximately up to the engine plenum 8b, and a single rear fuselage cowling 12b covers a rear portion of the air breathing propulsion engine 8a, approximately starting from the engine plenum 8b.

The rear fuselage cowling 12b preferably accommodates the gas exhaust 10 that is connected with a gas exhaust duct 10a, which is hereinafter also referred to as "exhaust nozzle 10a" for simplicity and clarity. This exhaust nozzle 10a is adapted for ducting a hot gas stream 10b, which is generated by the air breathing propulsion engine 8a in operation, from the latter via the gas exhaust 10 to an outside of the fuselage 2. Depending on an underlying flight mode, the hot gas stream 10b will then e.g. stream in direction of the dynamic air intake 9 as illustrated with arrows 10d, for instance in backward flight mode, or stream in an opposed direction as illustrated with arrows 10c, for instance in forward flight mode. The hot gas stream 10d that streams towards the dynamic air intake 9 can potentially be re-ingested into said dynamic air intake 9, as illustrated with arrows 10e.

According to one aspect, the front and rear fuselage cowlings 12a, 12b define the dynamic air intake 9. More specifically, the front and rear fuselage cowlings 12a, 12b are preferably spaced apart from each other in a direction transverse to the longitudinal axis 8d, i.e. in the direction of the horizontal axis 8e, by a predetermined cowling offset W. Thus, an air intake duct 9a with an inner duct surface 11a and an outer duct surface 11b is formed by said front and rear fuselage cowlings 12a, 12b, which is preferably at least partly funnel-shaped towards the engine plenum 8b. This air intake duct 9a, through which an intake air stream 14 is supplied to the air breathing propulsion engine 8a in operation and, more specifically, to the engine plenum 8b, has a width in the direction of the horizontal axis 8e that corresponds to the predetermined cowling offset W.

The predetermined cowling offset W is preferentially selected from a range between +0.025 times and +0.5 times of the maximum fuselage width AW. Preferably, the predetermined cowling offset W amounts to +0.2 times of said maximum fuselage width AW.

According to one aspect, the dynamic air intake 9 is provided with one or more, and illustratively with only one, air-permeable engine protection 13 that is adapted to clean the intake air stream 14 upstream of the engine plenum 8b such that a cleaned intake air stream 14a is supplied to the engine plenum 8b in an associated protection mode. The air-permeable engine protection 13 preferentially protects the dynamic air intake 9 at least against foreign objects (29 in FIG. 11).

Preferably, the air-permeable engine protection 13 is defined by a screen-like air cleaning element having an essentially flat or planar air cleaning surface. It should be noted that the term "essentially flat or planar" refers in the context of the present invention to a two-dimensional form that is at least approximately linear in one dimension or direction and that can e.g. be curved in the other dimension or direction, as explained in more detail below with reference to FIG. 7. Alternatively, said at least one air-permeable engine protection 13 defines a curved, kinked and/or discontinuous air cleaning surface. In other variants, the at least one air-permeable engine protection 13 has an air cleaning surface that combines two or more different shapes, i.e. that is partly planar and partly curved, or partly kinked and partly discontinuous, and so on. By way of example, a curved air-permeable engine protection 13a is also illustrated representative for all other possible variants.

By way of example, the air-permeable engine protection 13 comprises an inlet barrier filter with a filter mat. However, the present invention is not restricted to such inlet barrier filters and may likewise be realized with foreign object damage gutters, particle separators, ice protection grids and so on. Furthermore, a combination of two or more of such elements can also be realized. For instance, a foreign object damage gutter can be combined with an inlet barrier filter, and so on.

The air-permeable engine protection 13 is preferably arranged transverse to the front fuselage cowling 12a in the dynamic air intake 9 with a predetermined protection inclination angle α. This predetermined protection inclination angle α is preferentially selected from a range between +1° and +100°. Preferably, the predetermined protection inclination angle α between the front fuselage cowling 12a and the air-permeable engine protection 13 amounts to +15°.

According to one aspect, the dynamic air intake 9 comprises an outer intake cover 16 that extends from the rear fuselage cowling 12b in a direction opposed to the engine plenum 8b. This outer intake cover 16 preferably defines an outer scoop of the air intake duct 9a.

More specifically, the outer intake cover 16 preferably defines a cover front edge 16a that is, in the protection mode of the air-permeable engine protection 13, preferentially arranged downstream of a protection leading edge 15a of the air-permeable engine protection 13 and upstream of a protection trailing edge 15b of the air-permeable engine protection 13. The protection leading edge 15a is preferentially arranged in the associated protection mode at the front fuselage cowling 12a and the protection trailing edge 15b is, then, preferentially arranged at the rear fuselage cowling 12a.

Preferably, the cover front edge 16a of the outer intake cover 16 is spaced apart from the protection trailing edge 15b of the air-permeable engine protection 13 in a direction parallel to the longitudinal axis 8d of the air breathing propulsion engine 8a by a predetermined longitudinal cover offset O1. This predetermined longitudinal cover offset O1 is preferentially selected from a range between 0 times and +1.23 times of the maximum fuselage width AW. The predetermined longitudinal cover offset O1 preferably amounts to +0.23 times of the maximum fuselage width AW.

Furthermore, the outer intake cover 16 preferably protrudes from the rear fuselage cowling 12b in a direction transverse to the longitudinal axis 8d of the air breathing propulsion engine 8a, i.e. in the direction of the horizontal axis 8e, by a predetermined transverse cover offset O2. This predetermined transverse cover offset O2 is preferentially selected from a range between −0.19 times and +1.01 times of the maximum fuselage width AW. Preferably, the predetermined transverse cover offset O2 amounts to +0.01 times of the maximum fuselage width AW.

Figure 4:
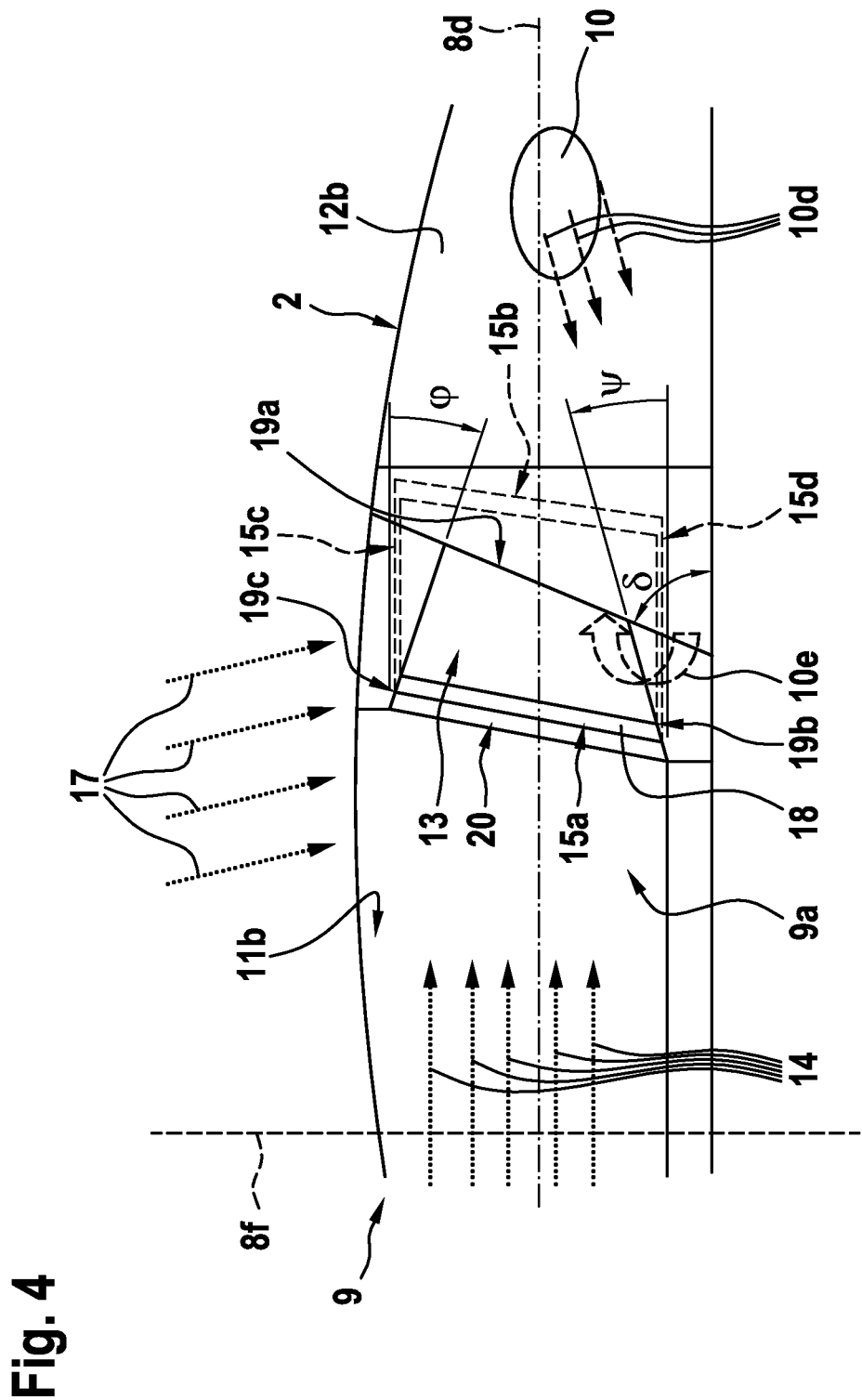
FIG. 4 shows a simplified sectional lateral view of the dynamic air intake of FIG. 3 seen in direction of an arrow IV of FIG. 3, with inner intake scoops according to a first embodiment.

FIG. 4 shows the dynamic air intake 9 of FIG. 3 with the rear fuselage cowling 12b that defines the outer duct surface 11b of the air intake duct 9a of FIG. 3. The dynamic air intake 9 is illustrated with its longitudinal axis 8d and a transversal axis 8f, which is, illustratively, perpendicular to the longitudinal axis 8d and also perpendicular to the horizontal axis 8e of FIG. 3. Therefore, the transversal axis 8f is also referred to as the "vertical axis 8f" in the context of the present invention.

According to one aspect, the dynamic air intake 9 is provided with a secondary intake 20, as described in more detail below with reference to FIG. 5, and with the air-permeable engine protection 13 of FIG. 3, which illustratively comprises a top edge 15c and a bottom edge 15d. The top edge 15c is preferably inclined relative to a horizontal plane (24a in FIG. 7) of the helicopter 1 of FIG. 1 and FIG. 2 by a predetermined top edge inclination angel (β in FIG. 7), such that the air-permeable engine protection 13 fits on the helicopter 1. The bottom edge 15d is preferably inclined relative to this horizontal plane (24a in FIG. 7) by a predetermined bottom edge inclination angel (γ in FIG. 7), such that the air-permeable engine protection 13 fits on the helicopter 1.

The predetermined top edge inclination angel (β in FIG. 7) is preferentially selected from a range between +15° and +155°, and comprises preferably +45°. The predetermined bottom edge inclination angel (γ in FIG. 7) is preferentially selected from a range between −140° and +55°, and comprises preferably +10°.

According to one aspect, the dynamic air intake 9 and, more particularly, the air intake duct 9a, comprises at least one inner intake scoop with a linear, curved, kinked and/or discontinuous shape. Preferably, the air intake duct 9a comprises at least one of an inner aft scoop 19a, an inner bottom scoop 19b and an inner top scoop 19c. However, the realization of one or more inner intake scoops preferably depends on their suitability for increasing an underlying distance to the exhaust nozzle 10 of FIG. 3 for protecting the dynamic air intake 9 against re-ingestion of the hot gas stream 10d, 10e of FIG. 3, for increasing a given dynamic pressure of the intake air stream 14, for adjusting an amount of the intake air stream 14 entering the engine plenum 8b of FIG. 3 as well as to adjust a mass-flow in specific regions of the dynamic air intake 9, and/or such that these inner intake scoops do not interfere or negatively influence performances of the air breathing propulsion engine 8a of FIG. 3 during hover and slow flight conditions.

Preferably, the inner intake scoops comprise a specific internal shape in order to reduce an up-coming air velocity and to increase the static pressure entering the engine plenum 8b of FIG. 3. This specific shape is preferentially basically a diffusor which is integrated in the inner intake scoops cross-section. It should, however, be noted that a respective configuration of each realized inner intake scoop and a particular location in the air intake duct 9a where each realized inner intake scoop should be positioned must be determined during development of the dynamic air intake 9 in an application-specific manner.

More specifically, this configuration and particular location may vary depending on an underlying configuration of the helicopter 1 of FIG. 1 and FIG. 2 as a whole due to a great variation of helicopter design in general. It should further be noted that the underlying configuration and particular location of each realized inner intake scoop is a design matter that is well-known to the person skilled in the art and that is, therefore, not explained in greater detail hereinafter, except the following basic characteristics.

By way of example, the air intake duct 9a comprises the inner aft scoop 19a that is inclined with respect to the protection bottom edge 15d of the air-permeable engine protection 13 with a predetermined aft inclination angle δ, the inner bottom scoop 19b that is inclined with respect to the protection bottom edge 15d with a predetermined bottom inclination angle Ψ, and the inner top scoop 19c that is inclined with respect to the protection top edge 15c of the air-permeable engine protection 13 with a predetermined top inclination angle φ. However, the realization of only one or two of the inner aft scoop 19a, the inner bottom scoop 19b and the inner top scoop 19c can be preferred and must be decided during development of the dynamic air intake 9, as explained above.

The predetermined top inclination angle φ is preferentially selected from a range between 0° and +180°, and comprises preferably +10°. The predetermined bottom inclination angle Ψ is preferentially selected from a range between 0° and +180°, and comprises preferably +10°. The predetermined aft inclination angle δ is preferentially selected from a range between +5° and +150°, and comprises preferably +80°.

Preferably, particular values for the predetermined top inclination angle φ, the predetermined bottom inclination angle Ψ and the predetermined aft inclination angle δ are determined such that the configuration of the inner aft scoop 19a, the inner bottom scoop 19b and the inner top scoop 19c are still favourable for hover of the helicopter 1 of FIG. 1 and FIG. 2, which is a main performance issue for the dynamic air intake 9. Therefore, an opening surface for arrangement of the air-permeable engine protection 13 that is available after provision of the inner aft scoop 19a, the inner bottom scoop 19b and/or the inner top scoop 19c in the air intake duct 9a should be affected positively and be suitable to ingest a corresponding rotor downwash 17 of the multi-blade main rotor 1a of FIG. 1 and FIG. 2, as well as calm surrounding air (17a in FIG. 5) during hover or slow flight of the helicopter 1 of FIG. 1 and FIG. 2.

Figure 5:
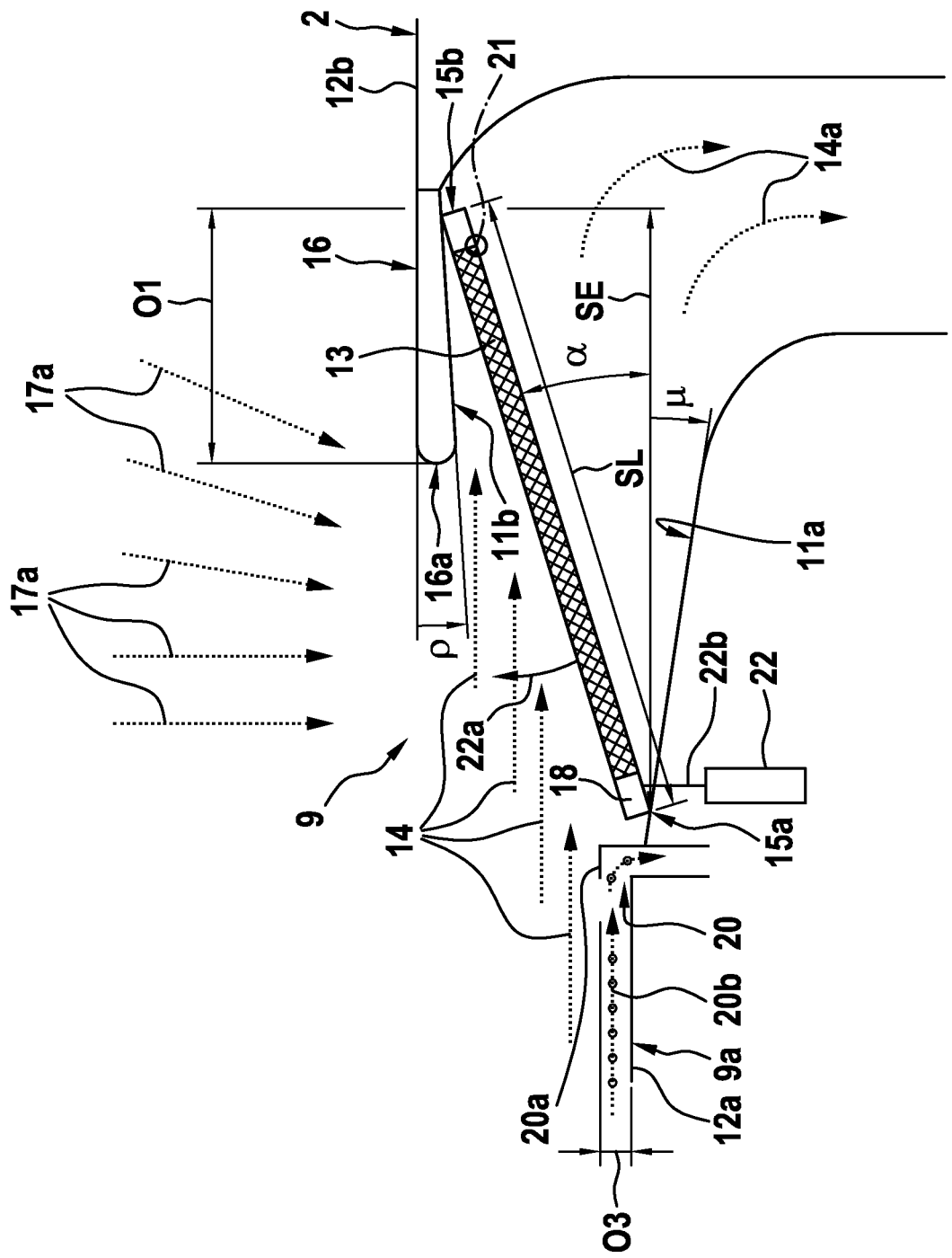
FIG. 5 shows a simplified sectional top view of the dynamic air intake of FIG. 3 with a moveable air-permeable engine protection in a closed position.

FIG. 5 shows the dynamic air intake 9 of FIG. 3 and FIG. 4 with the front and rear fuselage cowlings 12a, 12b that define the inner and outer duct surfaces 11a, 11b of the air intake duct 9a of FIG. 3 and FIG. 4, which is provided with the air-permeable engine protection 13. According to one aspect, the latter comprises a structural frame 18 that is illustratively connected to at least one actuator 22 by means of at least one actuation rod 22b.

Figure 6:
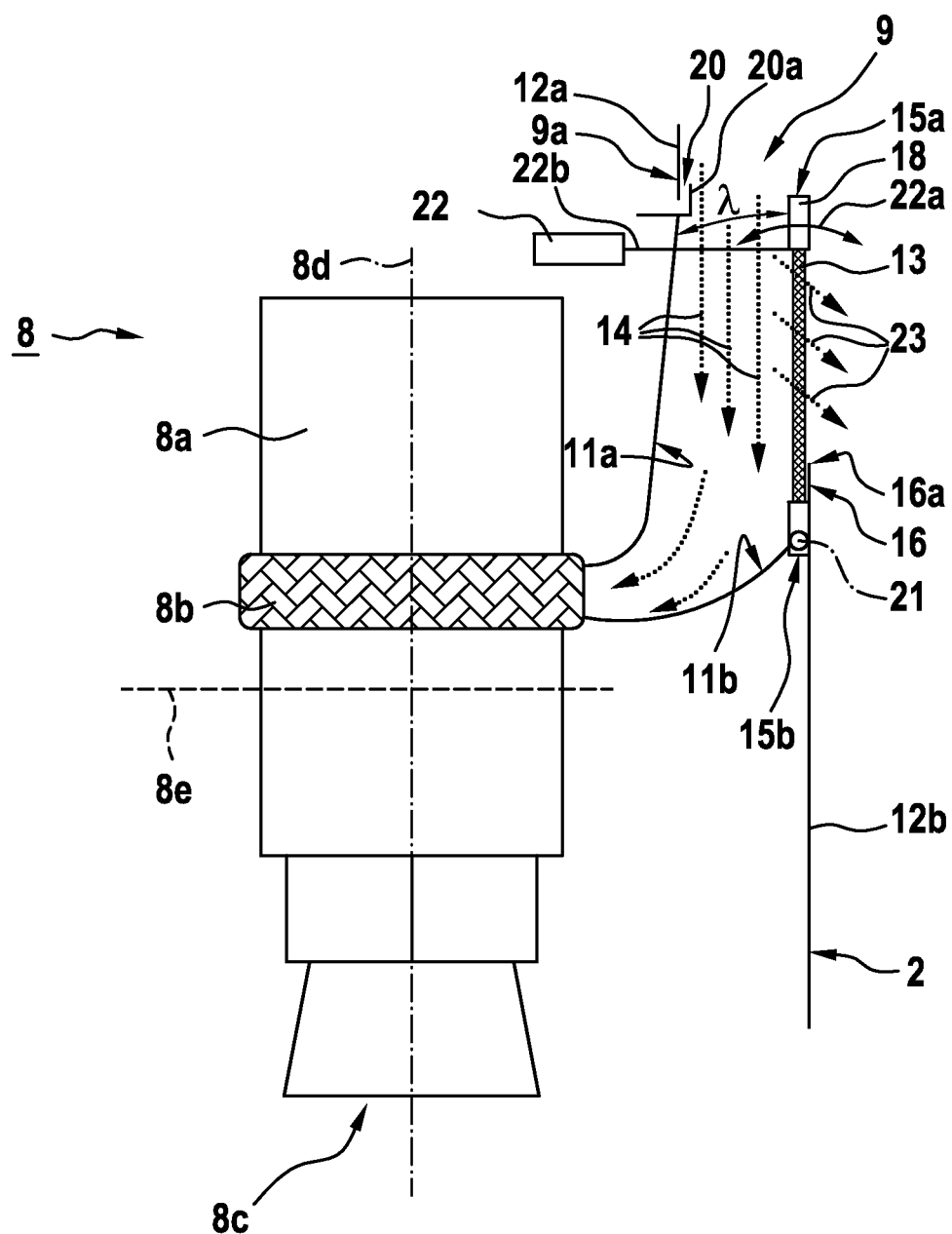
FIG. 6 shows the dynamic air intake of FIG. 5 with the moveable air-permeable engine protection in an opened position.

The actuator 22 is preferably adapted for pivoting the air-permeable engine protection 13 in a rotation direction 22a around at least one rotation axis 21 that is illustratively arranged adjacent to the trailing edge 15b of the air-permeable engine protection 13. Accordingly, the air-permeable engine protection 12 can at least be moved between an illustrated closed position associated with a protection mode, in which the air-permeable engine protection 13 is active, and an opened position associated with a bypass mode, as illustrated in FIG. 6, in which the air-permeable engine protection 13 is inactive so that the intake air stream 14 streams at least partly uncleansed into the engine plenum 8b of FIG. 3. In the illustrated closed position, the intake air stream 14 passes through the air-permeable engine protection 13 and is, thus, cleaned and freed of foreign objects (29 in FIG. 11), so that a cleaned intake air stream 14a enters the engine plenum 8b of FIG. 3.

However, it should be noted that the at least one rotation axis 21 must not necessarily be arranged adjacent to the trailing edge 15b and can alternatively be arranged adjacent to e.g. the leading edge 15a of the air-permeable engine protection or can be implemented by any other arbitrary axis. Furthermore, it should be noted that the present invention is not restricted to pivoting the air-permeable engine protection 13 around one or more rotation axes. Instead, linear and/or combined linear and rotational motion for displacement of the air-permeable engine protection is also contemplated.

As described above with reference to FIG. 3, the air-permeable engine protection 13 is preferably inclined in the air intake duct 9a by the predetermined protection inclination angle α of FIG. 3. Accordingly, an effective length SE of an effective protection surface of the air-permeable engine protection 13 can be increased with respect to an actual length SL thereof by tan α, as $SL = SE / \cos \alpha$. In other words, at a given actual length SL of the air-permeable engine protection 13, an underlying distance to the exhaust nozzle 10 of FIG. 3 can be increased by increasing the predetermined protection inclination angle α in the air intake duct 9a.

Preferably, the air intake duct 9a with the inner and outer duct surfaces 11a, 11b is defined to lead the intake air stream 14 and calm surrounding air 17a during hover or slow flight of the helicopter 1 of FIG. 1 and FIG. 2 in an aerodynamically optimized manner into the engine plenum 8b of FIG. 3. Therefore, the inner duct surface 11a is preferentially inclined with respect to the front fuselage cowling 12a with a predetermined inner duct inclination angle μ and/or the outer duct surface 11b is preferentially inclined with respect to the rear fuselage cowling 12b with a predetermined outer duct inclination angle ρ.

The predetermined inner duct inclination angle μ is preferentially selected from a range between 0° and +35°, and comprises preferably +5°. The predetermined outer duct inclination angle ρ is preferentially selected from a range between −5° and +35°, and comprises preferably +5°.

It should be noted that the predetermined inner duct inclination angle μ and the predetermined outer duct inclination angle ρ are preferably determined such that a diffusor effect is obtained with the air intake duct 9a, i.e. an internal velocity of the air intake stream 14 is reduced while the static pressure is increased. This is at least partly favorable for the performance of the air breathing propulsion engine 8a of FIG. 3 and decreases installation losses in general, as well as the possibility of flow separation in specific regions.

The above mentioned diffusor effect is at least partly obtained by providing the outer intake cover 16 and, more particularly, the outer duct surface 11b with a diffusor shape. As the latter preferably correlates to an entire shape of the rear fuselage cowling 12b, the predetermined outer duct inclination angle ρ may have negative values.

As described above with reference to FIG. 4, the dynamic air intake 9 preferably comprises a secondary intake 20 that is, according to one aspect, provided on the front fuselage cowling 12a. This secondary intake 20 is preferably at least adapted to ingest a stream 20b of water and/or a boundary layer streaming on the front fuselage cowling 12a towards the dynamic air intake 9. The secondary intake 20 is preferably further adapted to ingest uncleansed air 20b.

According to one aspect, the secondary intake 20 is arranged at a location upstream of the leading edge 15a of the air-permeable engine protection 13. More specifically, the secondary intake 20 is preferably provided between the front fuselage cowling 12a and a boundary layer separator 20a, which is preferably spaced apart from the front fuselage cowling 12a by a predetermined separator offset O3. The latter is preferentially selected from a range between +0.004 times and +0.015 times of the maximum fuselage width AW of the helicopter 1 of FIG. 2, and comprises preferably +0.005 times of this maximum fuselage width AW.

FIG. 6 shows the air breathing propulsion engine 8a of FIG. 3 and the dynamic air intake 9 of FIG. 5 with the front and rear fuselage cowlings 12a, 12b that define the inner and outer duct surfaces 11a, 11b of the air intake duct 9a of FIG. 5. The dynamic air intake 9 is provided with the air-permeable engine protection 13 of FIG. 5 that is illustratively shown in its opened position.

In the opened position, the intake air stream 14 is not cleaned. Hence the opened air-permeable engine protection 13 is used as a bypass and improves the characteristics of the dynamic air intake 9. Furthermore, the air-permeable engine protection 13 is preferably not airtight in the opened position, so that leakage air 23 can stream from the air intake duct 9a through the opened air-permeable engine protection 13 towards an outside of the fuselage 2 of FIG. 1 and FIG. 2. This cleans the potentially clogged air-permeable engine protection 13, if the latter is adapted therefore.

More specifically, according to one aspect the air-permeable engine protection 13 is rotated by the actuator 22 around the rotation axis 21 by an associated rotation angle λ relative to its closed position, which is preferentially comprised in a range between −90° and +90°, and which comprises preferably +15°. Illustratively, the associated rotation angle λ comprises +22° and a further rotation of the air-permeable engine protection 13 is blocked by the outer intake cover 16. It should be noted that these angle values may vary since a maximum achievable rotation angle λ is defined by the outer intake cover 16, which the air-permeable engine protection 13 hits in the opened mode. The rotation angle λ may also be negative, since the air-permeable engine protection 13 may rotate further outward if necessary.

Since the air-permeable engine protection 13 is rotated against a forward flight direction, strong loads will act on it as well as on its structural frame 18 and, thus, on the actuator 22. In order to reduce these loads, the inner intake scoops 19a, 19b, 19c of FIG. 4 and/or the outer intake cover 16 act as a limit stop for the air-permeable engine protection 13 in its opened position and, hence, will absorb loads and stress which will occur during forward flight operations.

However, it should be noted that a maximum achievable rotation angle λ generally depends on the realized inner intake scoops 19a, 19b, 19c of FIG. 4 and a necessary frontal intake surface of the air intake duct 9a that must be defined such that an intake air stream 14 that is sufficient for forward flight conditions can be supplied to the air breathing propulsion engine 8a. However, since the rotation angle λ strongly depends on the design of the front and rear fuselage cowlings 12a, 12b, the upper and lower values of the above-described value range would allow a full 180° rotation.

Figure 7:
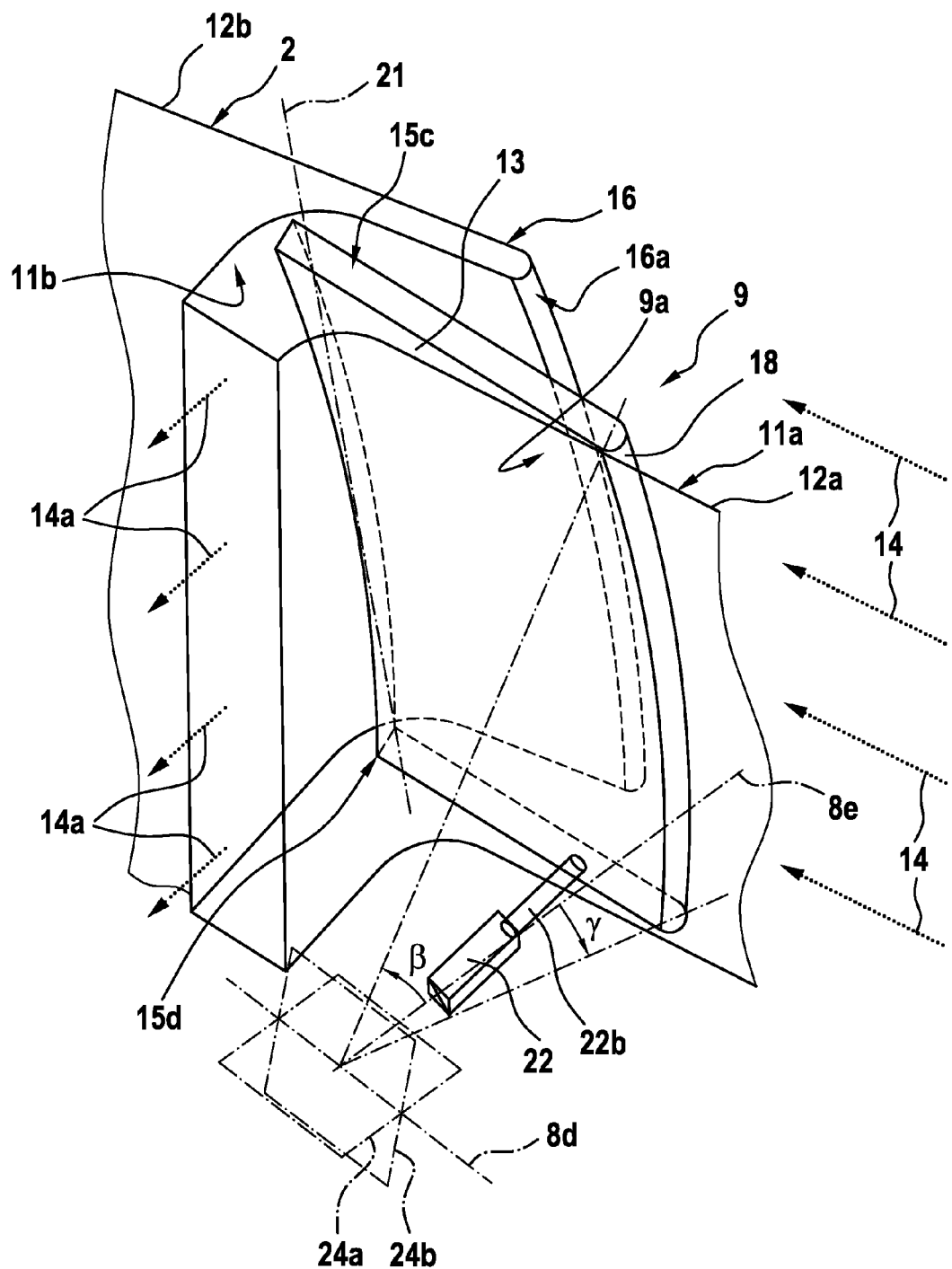
FIG. 7 shows the dynamic air intake of FIG. 5 from a different viewing angle.

FIG. 7 shows the dynamic air intake 9 with the air-permeable engine protection 13 of FIG. 3 and FIG. 4 having the structural frame 18 and the top and bottom edges 15c, 15d, which is arranged in the air intake duct 9a of FIG. 3 and FIG. 4. FIG. 7 further illustrates the actuator 22 with the actuation rod 22b and an exemplary location of the rotation axis 21 of FIG. 5 in the air intake duct 9a, as well as an exemplary arrangement of the air-permeable engine protection 13 in its closed position therein.

As described above with reference to FIG. 4, the top edge 15c is preferably inclined relative to a horizontal plane 24a of the helicopter 1 of FIG. 1 and FIG. 2 by a predetermined top edge inclination angel β, and the bottom edge 15d is preferably inclined relative to this horizontal plane 24a by a predetermined bottom edge inclination angel γ. The horizontal plane 24a is defined or spanned by the longitudinal axis 8d of FIG. 3 and the horizontal axis 8e of FIG. 3.

For illustration of a possibly inclined arrangement of the dynamic air intake 9, a vertical plane 24b that is perpendicular to the horizontal plane 24a is also shown. This vertical plane 24b is defined or spanned by the longitudinal axis 8d of FIG. 3 and the vertical axis 8f of FIG. 4.

FIG. 7 also illustrates the essentially flat or planar shape of the air-permeable engine protection 13 in greater detail. More specifically, the air-permeable engine protection 13 has a linear shape seen in direction of the longitudinal axis 8d and is, therefore, considered to be essentially flat or planar, even if the air-permeable engine protection 13 is curved in the vertical plane 24b.

Figure 8:
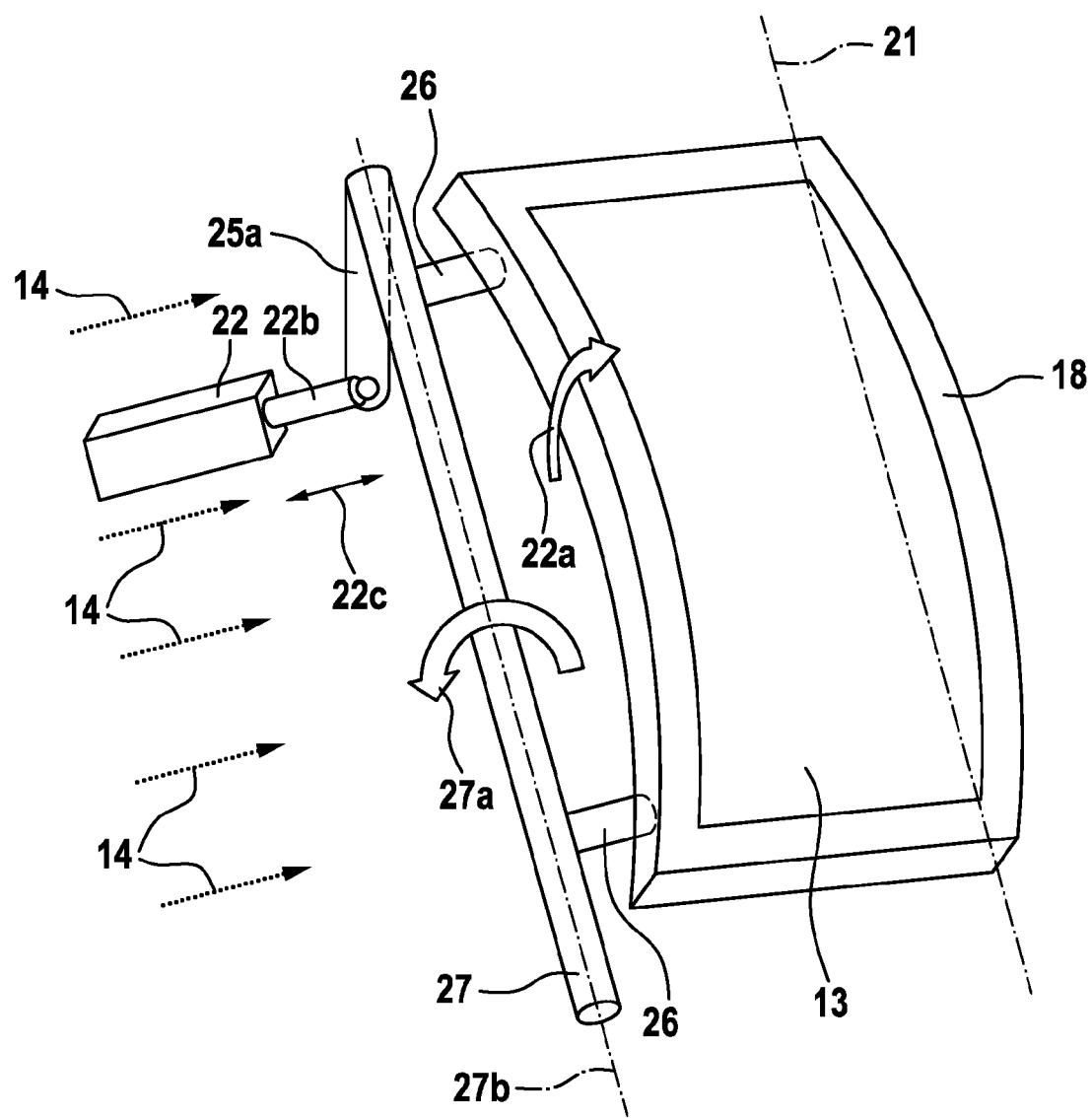
FIG. 8 shows a perspective view of the moveable air-permeable engine protection of FIG. 5 to FIG. 7 with a protection actuator according to a first embodiment.

FIG. 8 shows the air-permeable engine protection 13 of FIG. 5 with the structural frame 18, which is according to one aspect connected via at least one output cam 26, at least one transmission shaft 27 and at least one input cam 25a to the actuation rod 22b of the actuator 22 of FIG. 5. Preferably, the actuator 22 is mounted to the fuselage 2 of the helicopter 1 of FIG. 1 and FIG. 2.

Illustratively, the structural frame 18 is connected to two output cams 26, which are rigidly mounted to a single transmission shaft 27, which in turn is rigidly mounted to a single input cam 25a. The latter is rotatably mounted to the actuation rod 22b, e.g. by means of a suitable spherical or ball bearing.

In operation, the actuation rod 22b is preferably linearly moved in an actuation rod movement direction 22c for pushing or pulling the input cam 25a. When the input cam 25a is e.g. pulled, it rotates the transmission shaft 27a around an associated transmission shaft rotation axis 27b in a rotation direction 27a. The output cams 26 are, thus, pushed in the rotation direction 27a against the structural frame 18 and push the latter such that the air-permeable engine protection 13 is rotated in the rotation direction 22a around the rotation axis 21 of FIG. 5, e.g. into the opened position of FIG. 6. In order to move the air-permeable engine protection 13 in the described configuration back into its closed position, the input cam 25a must be pushed by the actuation rod 22b.

Figure 9:
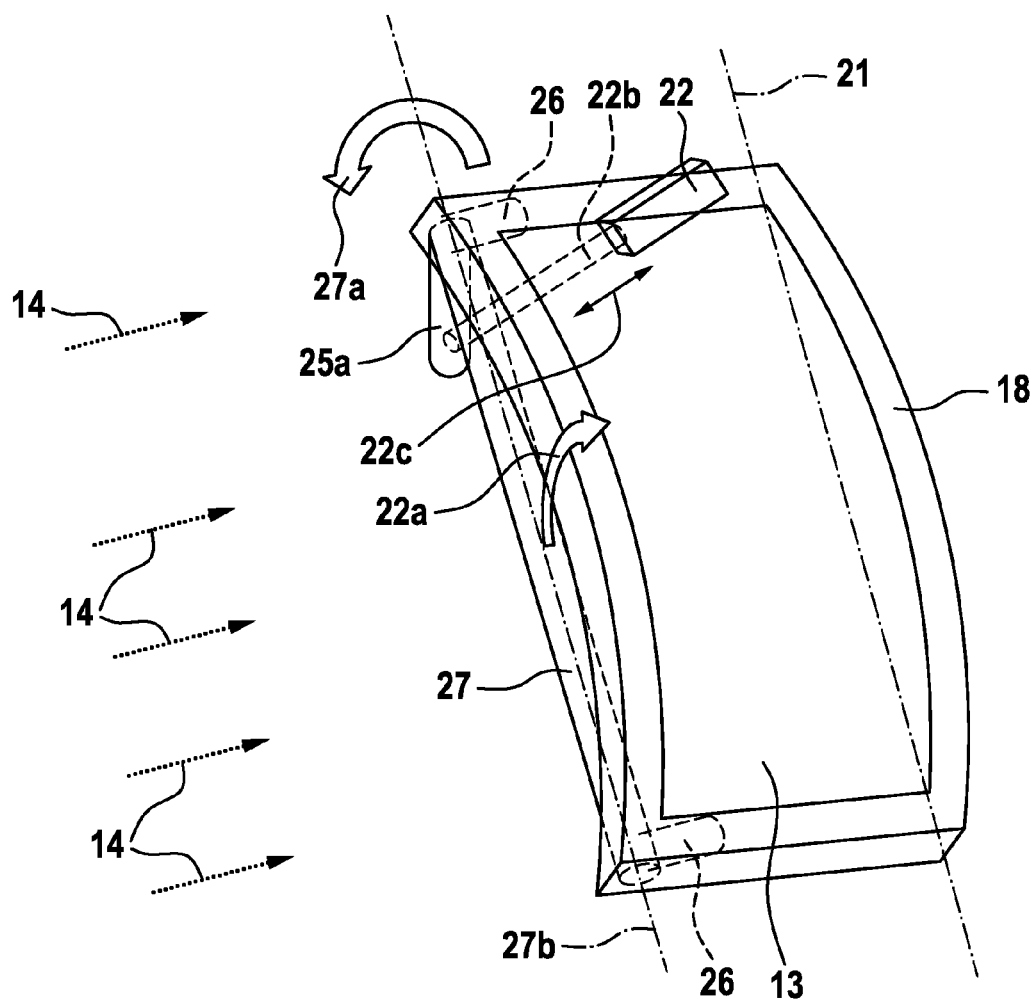
FIG. 9 shows a perspective view of the moveable air-permeable engine protection of FIG. 5 to FIG. 7 with a protection actuator according to a second embodiment.

FIG. 9 shows the air-permeable engine protection 13 of FIG. 8 with the structural frame 18, which is connected to the two output cams 26 that are rigidly mounted to the single transmission shaft 27, which in turn is rigidly mounted to the single input cam 25a that is rotatably mounted to the actuation rod 22b of the actuator 22 of FIG. 8. However, in contrast to FIG. 8 the actuator 22 is now mounted to the structural frame 18.

Figure 10:
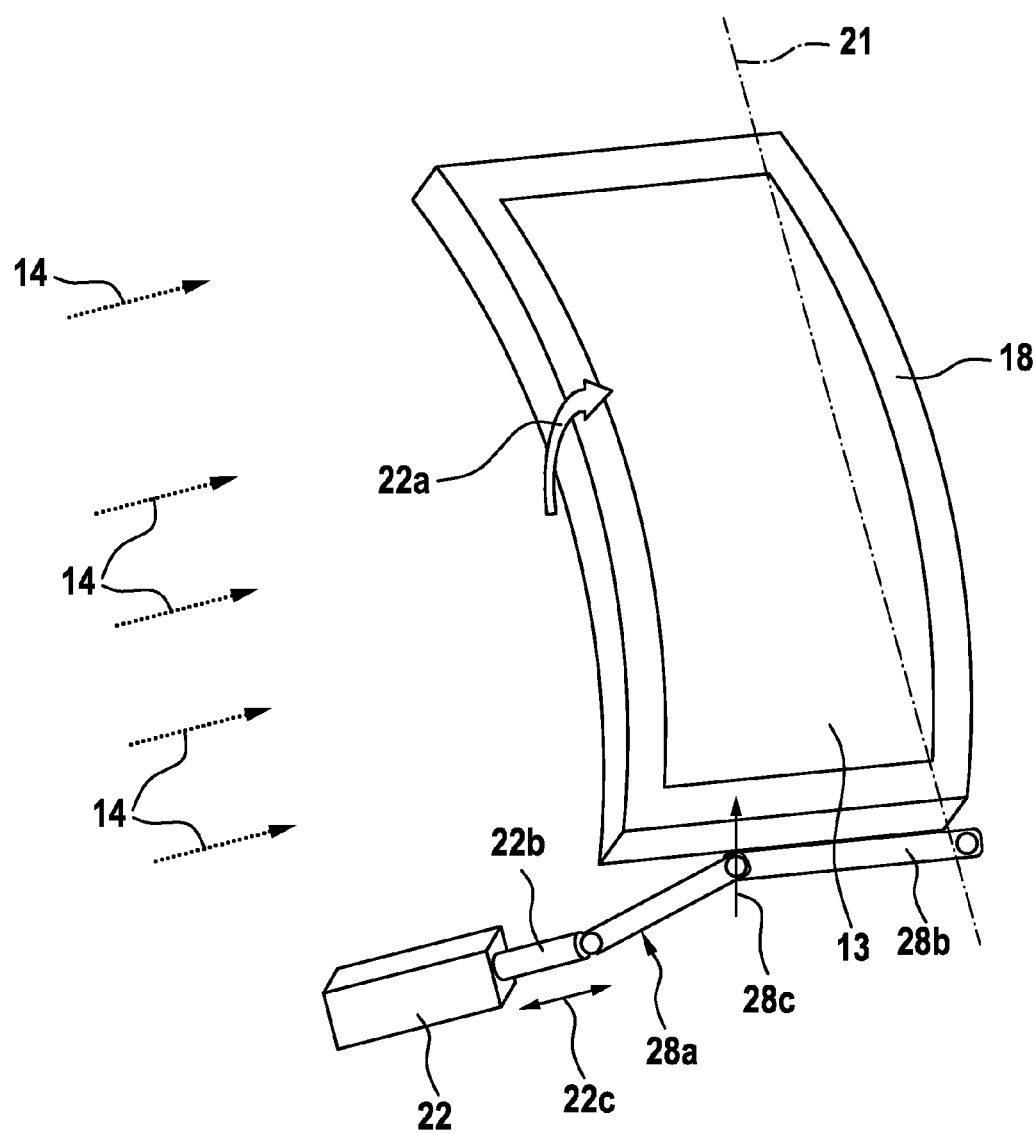
FIG. 10 shows a perspective view of the moveable air-permeable engine protection of FIG. 5 to FIG. 7 with a protection actuator according to a third embodiment.

FIG. 10 shows the air-permeable engine protection 13 of FIG. 5 with the structural frame 18, which is according to one aspect connected via a bell-crank lever mechanism or a similar mechanism by means of mechanical struts 28b, 28a to the actuation rod 22b of the actuator 22 of FIG. 5. Preferably, the actuator 22 is mounted to the fuselage 2 of the helicopter 1 of FIG. 1 and FIG. 2, similar to the arrangement in FIG. 8, and the mechanical struts 28a, 28b and the actuation rod 22b are interconnected by means of suitable hinges.

In operation, the actuation rod 22b is preferably linearly moved in the actuation rod movement direction 22c for pushing or pulling the mechanical strut 28a. When the mechanical strut 28a is e.g. pushed, it pushes the mechanical strut 28b in a direction 28c for rotating the structural frame 18 in the rotation direction 22a around the rotation axis 21 of FIG. 5 and, thus, pushes the air-permeable engine protection 13 e.g. into the opened position of FIG. 6. In order to move the air-permeable engine protection 13 in the described configuration back into its closed position, the mechanical strut 28a must be pulled by the actuation rod 22b.

Figure 11:
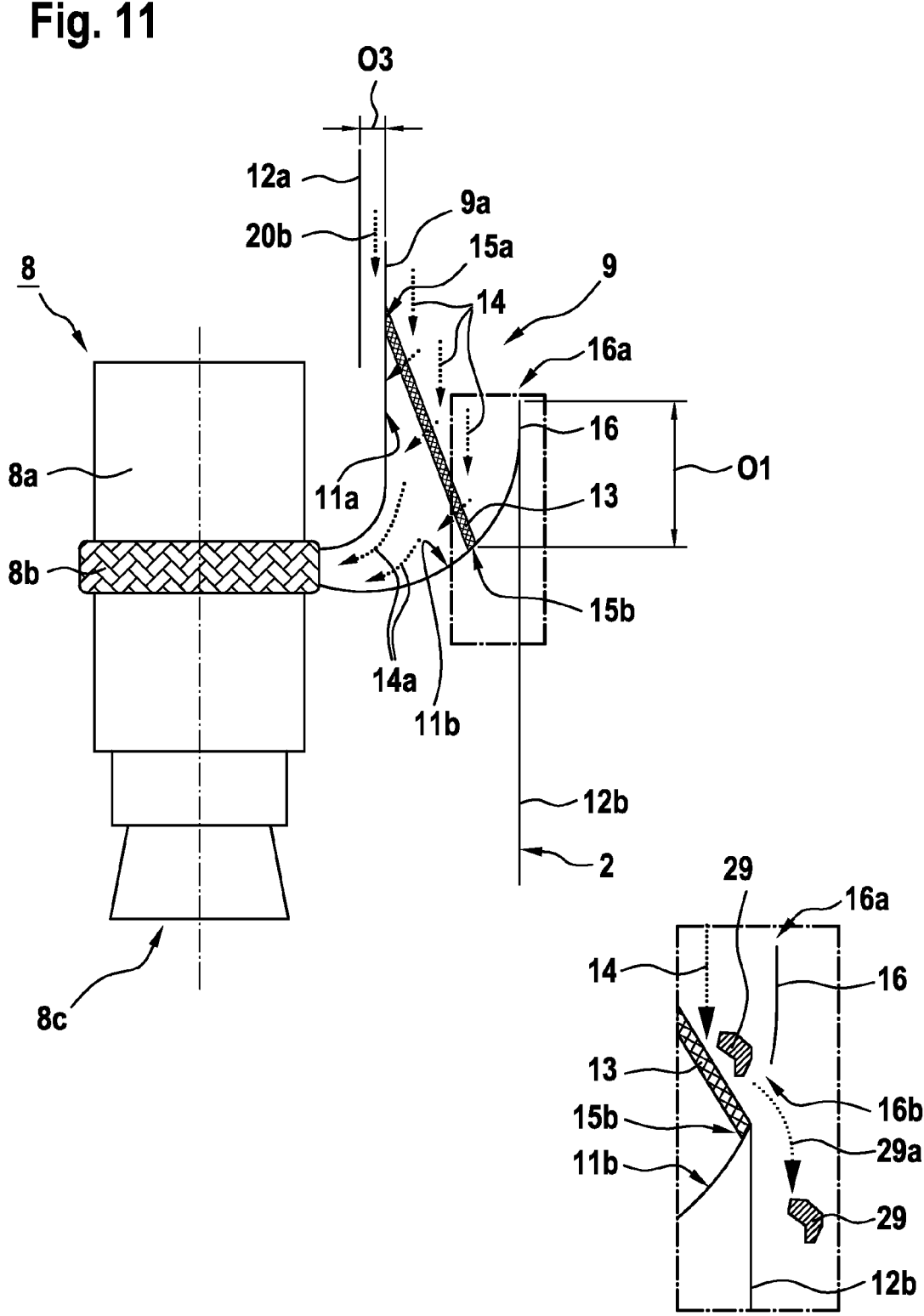
FIG. 11 shows the dynamic air intake of FIG. 3 with a secondary intake.

FIG. 11 shows the air breathing propulsion engine 8a with the fuselage 2 of FIG. 3 that comprises the front and rear fuselage cowlings 12a, 12b, which define the dynamic air intake 9 that is provided with the secondary intake 20 of FIG. 4. The dynamic air intake 9 is provided with the air-permeable engine protection 13 of FIG. 3 having the trailing edge 15b. The rear fuselage cowling 12b is provided with the outer intake cover 16 of FIG. 3.

According to one aspect, the outer intake cover 16 with its front edge 16a is flush with the rear fuselage cowling 12b. Preferably, the outer intake cover 16 and/or the rear fuselage cowling 12b are provided with an opening 16b, which may comprise a channel element arranged between the outer intake cover 16 and/or the rear fuselage cowling 12b depending on their configuration. The opening 16b is illustratively provided in the air intake duct 9a in a region upstream of the trailing edge 15b of the air-permeable engine protection 13. Preferably, the opening 16b is adapted to allow passing through of foreign objects 29 that should be removed from the intake air stream 14 in a preferred evacuation direction 29a.

Figure 12:
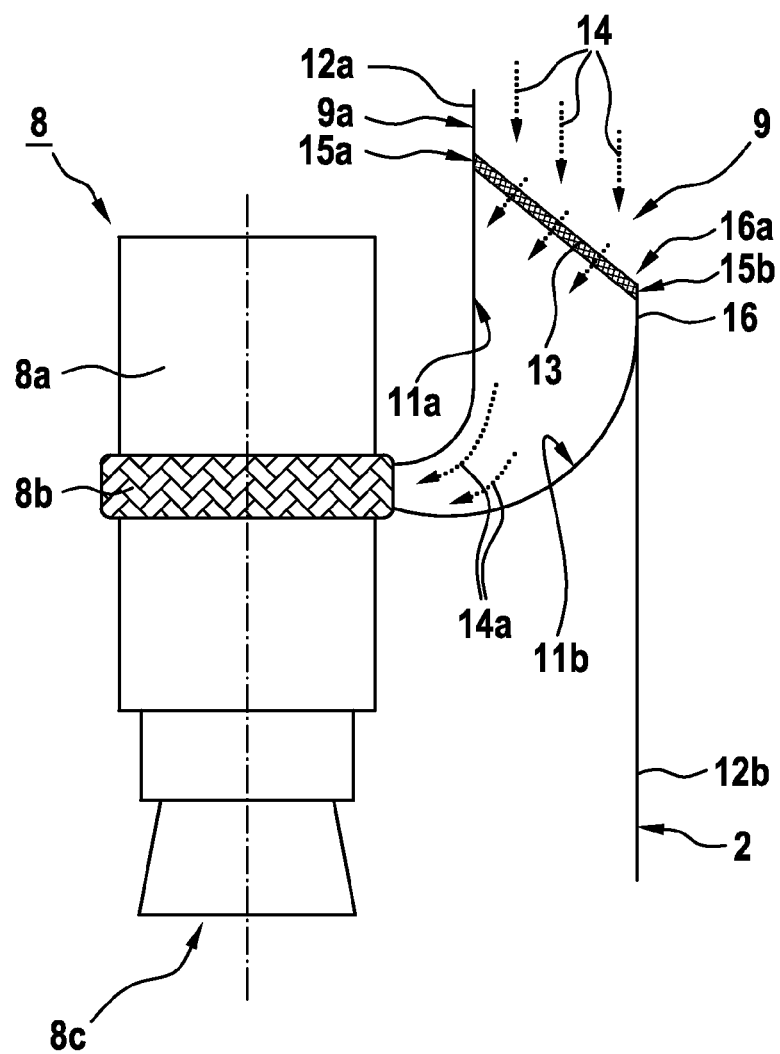
FIG. 12 shows the dynamic air intake of FIG. 3 with a stationary air-permeable engine protection according to a first embodiment.

FIG. 12 shows the air breathing propulsion engine 8a with the fuselage 2 of FIG. 3 that comprises the front and rear fuselage cowlings 12a, 12b, which define the dynamic air intake 9 of FIG. 3. The latter is provided with the air-permeable engine protection 13 of FIG. 3 having the trailing edge 15b. The rear fuselage cowling 12b is provided with the outer intake cover 16 of FIG. 3 having the front edge 16a. According to one aspect, the trailing edge 15b of the air-permeable engine protection 13 is arranged at the front edge 16a of the outer intake cover 16, or at least in close proximity thereto.

Figure 13:
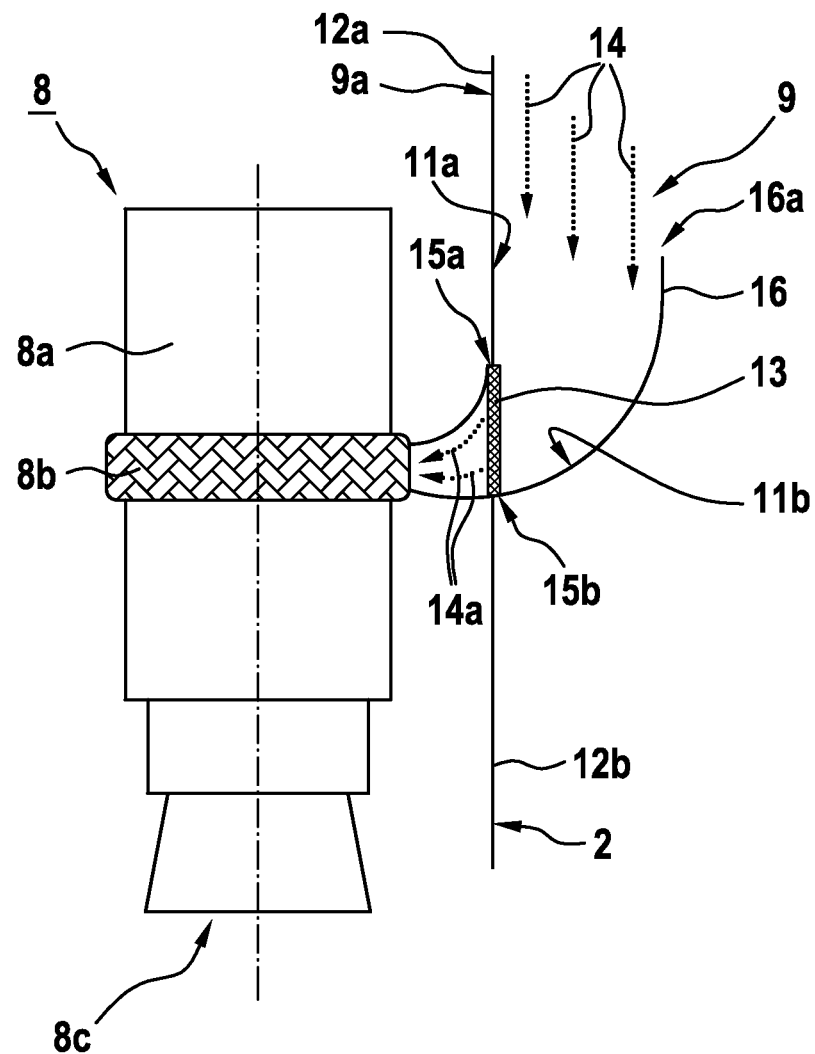
FIG. 13 shows the dynamic air intake of FIG. 3 with a stationary air-permeable engine protection according to a second embodiment.

FIG. 13 shows the air breathing propulsion engine 8a with the fuselage 2 of FIG. 3 that comprises the front and rear fuselage cowlings 12a, 12b, and further shows the air-permeable engine protection 13 of the dynamic air intake 9 of FIG. 3. According to one aspect, the front fuselage cowling 12a is flush with the rear fuselage cowling 12b, and the air-permeable engine protection 13 is flush with both of the front and rear fuselage cowlings 12a, 12b. In this case, the outer intake cover 16 defines an outer scoop of the dynamic air intake 9.

Figure 14:
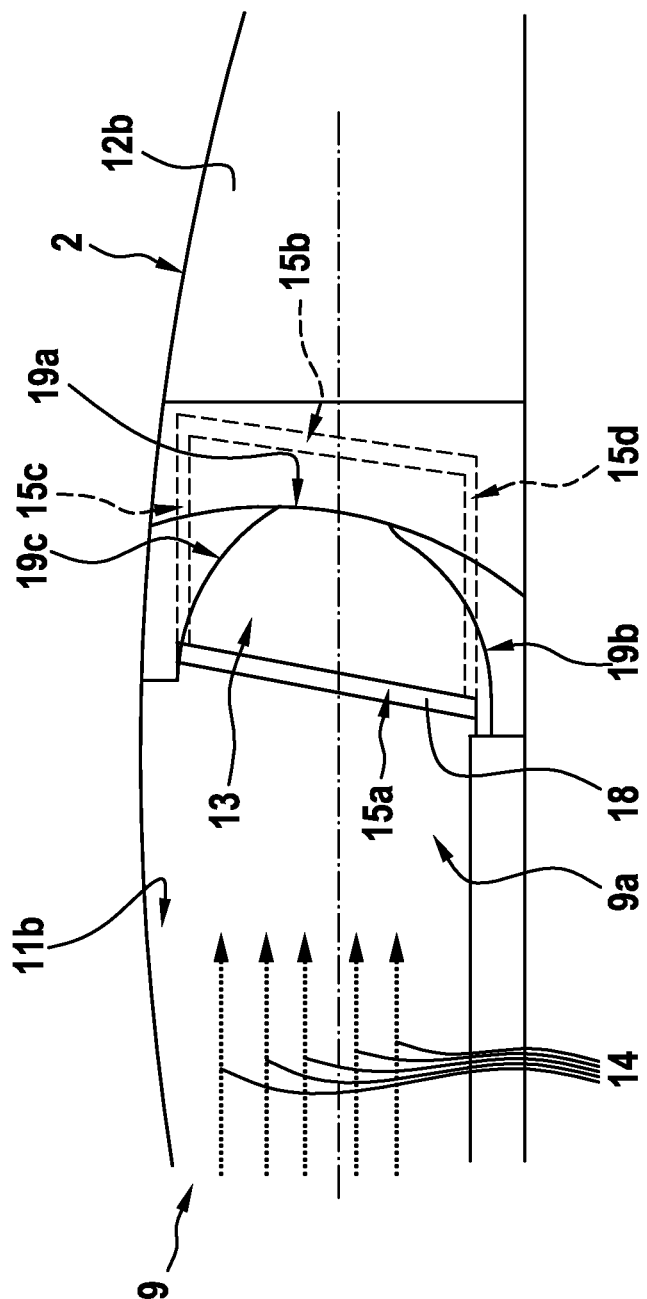
FIG. 14 shows a simplified sectional lateral view of the dynamic air intake of FIG. 3 with inner intake scoops according to a second embodiment.

FIG. 14 shows the dynamic air intake 9 of FIG. 4 with the inner aft scoop 19a, the inner bottom scoop 19b and the inner top scoop 19c. According to one aspect, these scoops 19a, 19b, 19c are provided with non-linear leading edges, illustratively with curved leading edges. However, it should be noted that other shapes are also contemplated.

Figure 15:
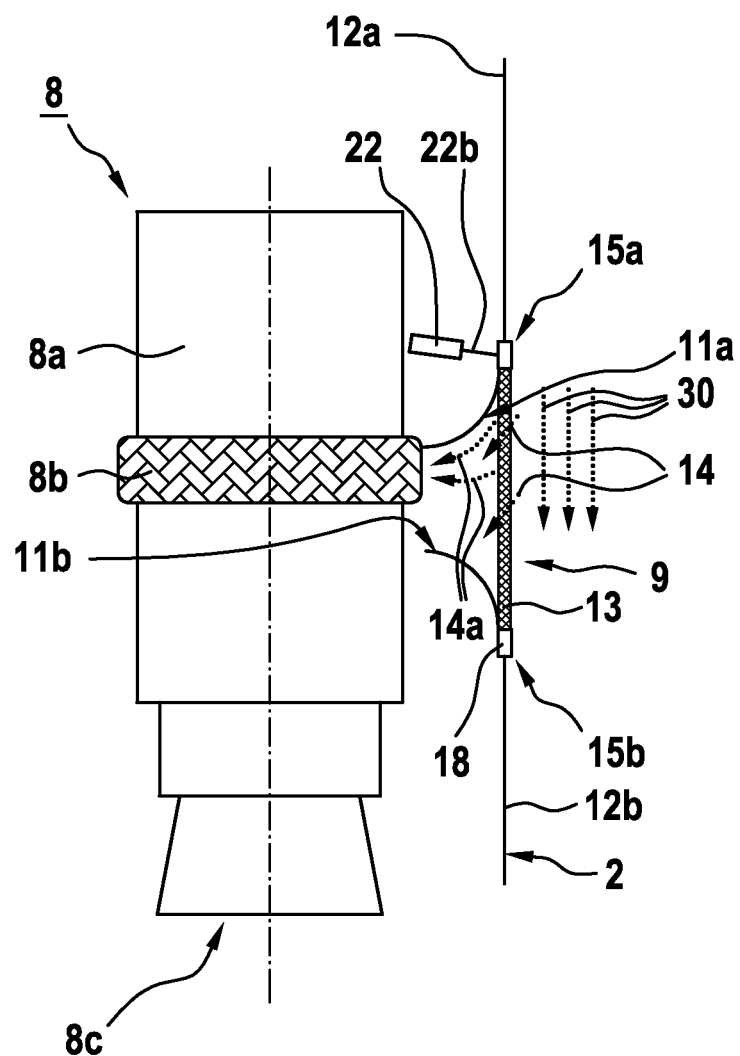
FIG. 15 shows a simplified sectional top view of the air breathing propulsion engine of FIG. 1 and FIG. 2 with a simplified version of the dynamic air intake of FIG. 3 in protection mode.

FIG. 15 shows the air breathing propulsion engine 8a with the fuselage 2 of FIG. 13 that comprises the front and rear fuselage cowlings 12a, 12b, and further shows the air-permeable engine protection 13 of the dynamic air intake 9 of FIG. 13. The air-permeable engine protection 13 is actuatable be means of the actuator 22 of FIG. 5 and the front fuselage cowling 12a is flush with the rear fuselage cowling 12b, and the air-permeable engine protection 13 is in its closed position, i.e. in the protection mode, flush with both of the front and rear fuselage cowlings 12a, 12b. In this configuration, a laterally passing air stream 30 is ingested into the air breathing propulsion engine 8a.

Figure 16:
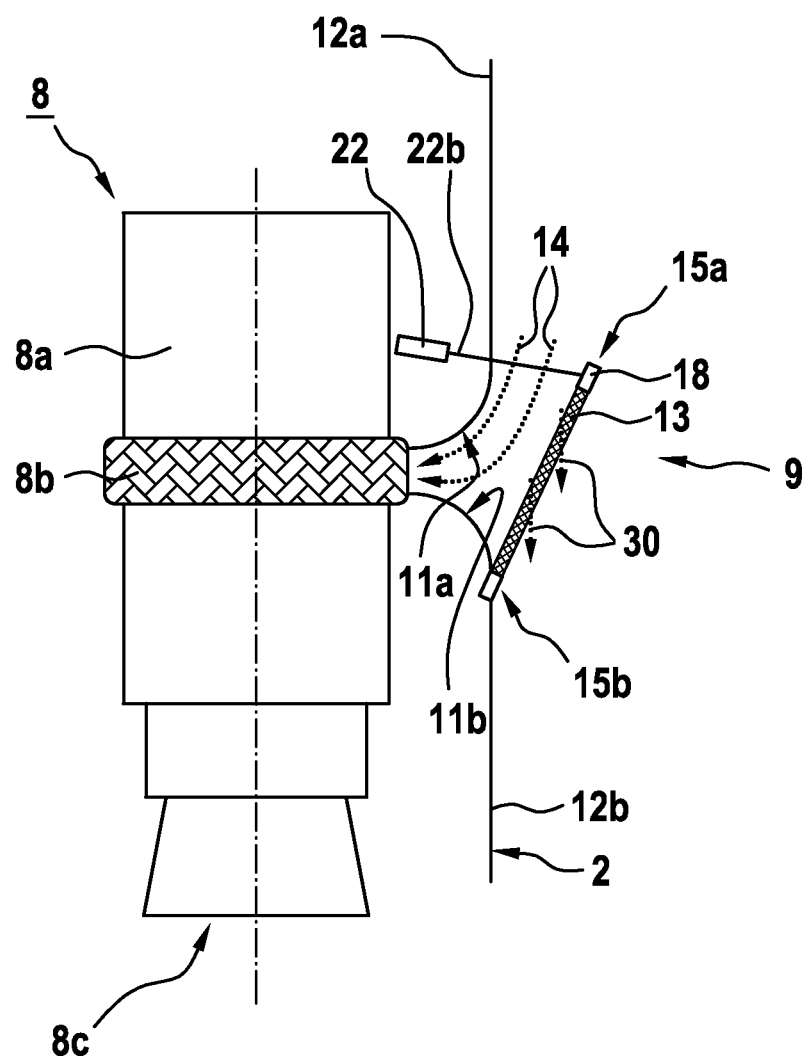
FIG. 16 shows a simplified sectional top view of the arrangement of FIG. 15 in bypass mode.

FIG. 16 shows the arrangement of FIG. 15, wherein the air-permeable engine protection 13 was moved by the actuator 22 in its opened position. Accordingly, the air-permeable engine protection 13 is in the bypass mode, where the intake air stream 14 enters the air breathing propulsion engine 8a uncleansed. However, in this mode the air-permeable engine protection 13 can be cleaned by the laterally passing air stream 30, as explained above with reference to FIG. 6.

It should be noted that modifications to the above described embodiments are within the common knowledge of the person skilled in the art and, thus, also considered as being part of the present invention. More specifically, various different configurations of the dynamic air intake 9 are described above, wherein the air-permeable engine protection 13 can be actuatable or not and wherein it can be arranged in various different ways. However, all these configurations and arrangements can, and must, be modified by the person skilled in the art in an application-specific manner depending on underlying characteristics of the dynamic air intake that must be realized for a given aircraft.

REFERENCE LIST

| | |
|---|---|
| 1 | aircraft |
| 1a | multi-blade main rotor |
| 1b, 1c, 1d, 1e | rotor blades |
| 1f | rotor head |
| 1g | rotor shaft |
| 2 | fuselage |
| 2a | tail boom |
| 2b | cabin |
| 3 | counter-torque device |
| 4 | bumper |
| 5 | fin |
| 5a | tail wing |
| 6 | landing gear |
| 7 | main gear box |
| 8 | power generation system |
| 8a | air breathing propulsion engine |
| 8b | engine integrated air inlet (plenum) |
| 8c | engine integrated gas exhaust |
| 8d | propulsion engine longitudinal axis |
| 8e | horizontal propulsion engine transverse axis |
| 8f | vertical propulsion engine transverse axis |
| 9 | air intake |
| 9a | air intake duct |
| 10 | gas exhaust |

-continued

| | |
|---|---|
| 10a | gas exhaust duct (exhaust nozzle) |
| 10b | hot exhausted gas stream |
| 10c | forward flight exhausted gas streaming direction |
| 10d | backward flight exhausted gas streaming direction |
| 10e | exhausted gas re-ingestion direction |
| 11a | air intake inner duct surface |
| 11b | air intake outer duct surface |
| 12a | front fuselage cowling |
| 12b | rear fuselage cowling |
| 13 | air-permeable engine protection |
| 13a | air-permeable engine protection variant |
| 14 | intake air stream |
| 14a | cleaned intake air stream |
| 15a | protection leading edge |
| 15b | protection trailing edge |
| 15c | protection top edge |
| 15d | protection bottom edge |
| 16 | outer intake cover |
| 16a | outer intake cover front edge |
| 16b | outer intake cover opening |
| 17 | rotor downwash |
| 17a | surrounding intake air stream |
| 18 | protection structural frame |
| 19a | air intake aft scoop |
| 19b | air intake bottom scoop |
| 19c | air intake top scoop |
| 20 | secondary intake |
| 20a | boundary layer separator |
| 20b | air and/or water stream and/or boundary layer |
| 21 | protection rotation axis |
| 22 | protection actuator |
| 22a | protection rotation direction |
| 22b | actuation rod |
| 22c | actuation rod movement direction |
| 23 | leakage air |
| 24a | horizontal plane |
| 24b | vertical plane |
| 25a | input cam |
| 26 | output cams |
| 27 | transmission shaft |
| 27a | transmission shaft rotation direction |
| 27b | transmission shaft rotation axis |
| 28a, 28b | mechanism struts |
| 28c | mechanism strut movement direction |
| 29 | foreign objects |
| 29a | foreign object evacuation direction |
| 30 | laterally passing air stream |
| $\alpha$ | inclination angle of protection |
| $\beta$ | ending angle of protection top edge |
| $\gamma$ | starting angle of protection down edge |
| $\delta$ | inclination angle of air intake aft scoop |
| $\psi$ | inclination angle of air intake bottom scoop |
| $\phi$ | inclination angle of air intake top scoop |
| $\rho$ | inclination angle of air intake outer duct |
| $\mu$ | inclination angle of air intake inner duct |
| $\lambda$ | rotation angle of protection |
| AW | aircraft width |
| W | intake width |
| O1 | longitudinal cover offset |
| O2 | transverse cover offset |
| O3 | boundary layer separator offset |
| SE | protection extension |
| SL | protection length |

What is claimed is:

1. An aircraft with a fuselage that accommodates at least one air breathing propulsion engine, the fuselage having a maximum fuselage width (AW) determined in the region of the at least one air breathing propulsion engine and comprising at least one front fuselage cowling and at least one rear fuselage cowling that are each covering the at least one air breathing propulsion engine at least partly, the at least one front and rear fuselage cowlings being spaced apart from each other in a direction transverse to a longitudinal axis of the at least one air breathing propulsion engine by a predetermined cowling offset (W) to define a dynamic air intake through which an intake air stream is supplied to the at least one air breathing propulsion engine in operation, the dynamic air intake defining an at least partly funnel-shaped air duct towards an engine integrated air inlet and being provided with at least one air-permeable engine protection member that is adapted to clean the intake air stream upstream of the engine integrated air inlet in an associated protection mode, the at least one air-permeable engine protection member being arranged transverse to the at least one front fuselage cowling with a predetermined protection inclination angle ($\alpha$), wherein the dynamic air intake comprises an outer intake cover that extends from the at least one rear fuselage cowling in a direction opposed to the engine integrated air inlet, the outer intake cover defining an outer scoop of the at least partly funnel-shaped air duct, and wherein the outer intake cover defines a cover front edge and that the at least one air-permeable engine protection member defines a protection leading edge and a protection trailing edge, the protection leading edge being arranged, in the associated protection mode, upstream of the cover front edge at the at least one front fuselage cowling and the protection trailing edge being arranged, in the associated protection mode, downstream of the cover front edge at the at least one rear fuselage cowling.

2. The aircraft according to claim 1, wherein the predetermined cowling offset (W) is selected from a range between +0.025 times and +0.5 times of the maximum fuselage width (AW).

3. The aircraft according to claim 1, wherein the predetermined protection inclination angle ($\alpha$) is selected from a range between +1° and +100°.

4. The aircraft according to claim 1, wherein the outer intake cover protrudes from the at least one rear fuselage cowling in a direction transverse to the longitudinal axis of the at least one air breathing propulsion engine by a predetermined transverse cover offset (O2), the predetermined transverse cover offset (O2) being selected from a range between −0.19 times and +1.01 times of the maximum fuselage width (AW).

5. The aircraft according to claim 1, wherein the cover front edge of the outer intake cover is spaced apart from the protection trailing edge of the at least one air-permeable engine protection member in a direction parallel to the longitudinal axis of the at least one air breathing propulsion engine by a predetermined longitudinal cover offset (O1), the predetermined longitudinal cover offset (O1) being selected from a range between 0 times and +1.23 times of the maximum fuselage width (AW).

6. The aircraft according to claim 5, wherein the predetermined longitudinal cover offset (O1) comprises +0.23 times of the maximum fuselage width (AW).

7. The aircraft according to claim 1, wherein the at least partly funnel-shaped air duct comprises at least one inner intake scoop with a linear, curved, kinked and/or discontinuous shape.

8. The aircraft according to claim 7, wherein the at least one inner intake scoop comprises at least one of an inner top scoop that is inclined with respect to a protection top edge of the at least one air-permeable engine protection member with a predetermined top inclination angle ($\phi$), an inner bottom scoop that is inclined with respect to a protection bottom edge of the at least one air-permeable engine protection member with a predetermined bottom inclination angle ($\Psi$), and an inner aft scoop that is inclined with respect to a protection bottom edge of the at least one air-permeable engine protection member with a predetermined aft inclination angle (δ), wherein the predetermined top inclination angle (φ) is selected from a range between 0° and +180°, the predetermined bottom inclination angle (Ψ) is selected from a range between 0° and +180°, and the predetermined aft inclination angle (δ) is selected from a range between +5° and +150°.

9. The aircraft according to claim 1, wherein the at least one air-permeable engine protection member comprises a top edge and a bottom edge, the top edge being inclined relative to a horizontal plane of the aircraft by a predetermined top edge inclination angel (β) that is selected from a range between +15° and +155°, and the bottom edge being inclined relative to the horizontal plane of the aircraft by a predetermined bottom edge inclination angel (γ) that is selected from a range between −140° and +55°.

10. The aircraft according to claim 1, wherein an inner duct surface of the at least partly funnel-shaped air duct is inclined with respect to the at least one front fuselage cowling with a predetermined inner duct inclination angle (μ), the predetermined inner duct inclination angle (μ) being selected from a range between 0° and +35°.

11. The aircraft according to claim 1, wherein an outer duct surface of the at least partly funnel-shaped air duct is inclined with respect to the at least one rear fuselage cowling with a predetermined outer duct inclination angle (ρ), the predetermined outer duct inclination angle (ρ) being selected from a range between −5° and +35°.

12. The aircraft according to claim 1, wherein at least one protection actuator is provided for moving the at least one air-permeable engine protection member between a closed position associated with the associated protection mode and an opened position associated with a bypass mode in which the intake air stream streams at least partly uncleansed into the engine integrated air inlet.

13. The aircraft according to claim 1, wherein the dynamic air intake comprises a secondary intake provided on the at least one front fuselage cowling, the secondary intake being at least adapted to ingest water and/or a boundary layer streaming on the at least one front fuselage cowling towards the dynamic air intake and/or to ingest uncleansed air.

14. The aircraft according to claim 13, wherein the secondary intake is provided between the at least one front fuselage cowling and a boundary layer separator (20a), the boundary layer separator being spaced apart from the at least one front fuselage cowling by a predetermined separator offset (O3) that is selected from a range between +0.004 times and +0.015 times of the maximum fuselage width (AW).

15. The aircraft according to claim 1, wherein the predetermined cowling offset (W) comprises +0.2 times of the maximum fuselage width (AW).

16. The aircraft according to claim 1, wherein the predetermined transverse cover offset (O2) comprises +0.01 times of the maximum fuselage width (AW).

17. An aircraft with a fuselage that accommodates at least one air breathing propulsion engine, the fuselage having a maximum fuselage width (AW) determined in the region of the at least one air breathing propulsion engine and comprising at least one front fuselage cowling and at least one rear fuselage cowling that are each covering the at least one air breathing propulsion engine at least partly, the at least one front and rear fuselage cowlings being spaced apart from each other in a direction transverse to a longitudinal axis of the at least one air breathing propulsion engine by a predetermined cowling offset (W) to define a dynamic air intake through which an intake air stream is supplied to the at least one air breathing propulsion engine in operation, the dynamic air intake defining an at least partly funnel-shaped air duct towards an engine integrated air inlet and being provided with at least one air-permeable engine protection member that is adapted to clean the intake air stream upstream of the engine integrated air inlet in an associated protection mode, the at least one air-permeable engine protection member being arranged transverse to the at least one front fuselage cowling with a predetermined protection inclination angle (α), wherein the at least partly funnel-shaped air duct comprises at least one inner intake scoop with a linear, curved, kinked and/or discontinuous shape, and wherein the at least one inner intake scoop comprises at least one of an inner top scoop that is inclined with respect to a protection top edge of the at least one air-permeable engine protection member with a predetermined top inclination angle (φ), an inner bottom scoop that is inclined with respect to a protection bottom edge of the at least one air-permeable engine protection member with a predetermined bottom inclination angle (Ψ), and an inner aft scoop that is inclined with respect to a protection bottom edge of the at least one air-permeable engine protection member with a predetermined aft inclination angle (δ), wherein the predetermined top inclination angle (φ) is selected from a range between 0° and +180°, the predetermined bottom inclination angle (Ψ) is selected from a range between 0° and +180°, and the predetermined aft inclination angle (δ) is selected from a range between +5° and +150°.

18. An aircraft with a fuselage that accommodates at least one air breathing propulsion engine, the fuselage having a maximum fuselage width (AW) determined in the region of the at least one air breathing propulsion engine and comprising at least one front fuselage cowling and at least one rear fuselage cowling that are each covering the at least one air breathing propulsion engine at least partly, the at least one front and rear fuselage cowlings being spaced apart from each other in a direction transverse to a longitudinal axis of the at least one air breathing propulsion engine by a predetermined cowling offset (W) to define a dynamic air intake through which an intake air stream is supplied to the at least one air breathing propulsion engine in operation, the dynamic air intake defining an at least partly funnel-shaped air duct towards an engine integrated air inlet and being provided with at least one air-permeable engine protection member that is adapted to clean the intake air stream upstream of the engine integrated air inlet in an associated protection mode, the at least one air-permeable engine protection member being arranged transverse to the at least one front fuselage cowling with a predetermined protection inclination angle (α), and wherein the dynamic air intake comprises an outer intake cover that defines a cover front edge and that the at least one air-permeable engine protection member defines a protection leading edge and a protection trailing edge, the protection leading edge being arranged, in the associated protection mode, upstream of the cover front edge at the at least one front fuselage cowling and the protection trailing edge being arranged, in the associated protection mode, downstream of the cover front edge at the at least one rear fuselage cowling.

* * * * *